United States Patent
Zhang et al.

(10) Patent No.: US 9,975,196 B2
(45) Date of Patent: May 22, 2018

(54) MEASUREMENT OF THREE-DIMENSIONAL WELDING TORCH ORIENTATION FOR MANUAL ARC WELDING PROCESS

(71) Applicant: Illinois Tool Works Inc., Glenview, IL (US)

(72) Inventors: Yuming Zhang, Nicholasville, KY (US); WeiJie Zhang, Windsor (CA)

(73) Assignee: University of Kentucky Research Foundation, Lexington, KY (US)

( * ) Notice: Subject to any disclaimer, the term of this patent is extended or adjusted under 35 U.S.C. 154(b) by 388 days.

(21) Appl. No.: 14/928,496

(22) Filed: Oct. 30, 2015

(65) Prior Publication Data
US 2016/0193679 A1 Jul. 7, 2016

Related U.S. Application Data

(60) Provisional application No. 62/099,859, filed on Jan. 5, 2015.

(51) Int. Cl.
| | |
|---|---|
| *G01C 21/16* | (2006.01) |
| *B23K 9/095* | (2006.01) |
| *G01C 25/00* | (2006.01) |
| *G01P 21/00* | (2006.01) |

(52) U.S. Cl.
CPC ......... *B23K 9/0953* (2013.01); *G01C 21/16* (2013.01); *G01C 25/00* (2013.01); *G01P 21/00* (2013.01)

(58) Field of Classification Search
CPC ....... G01C 21/16; G01C 21/165; G01C 21/18
USPC .......................................................... 33/318
See application file for complete search history.

(56) References Cited

U.S. PATENT DOCUMENTS

| | | | |
|---|---|---|---|
| 4,021,840 A | 5/1977 | Ellsworth et al. |
| 4,577,796 A | 3/1986 | Powers et al. |
| 4,641,292 A | 2/1987 | Tunnell et al. |
| 4,733,051 A | 3/1988 | Nadeau et al. |
| 4,812,614 A | 3/1989 | Wang et al. |
| 5,572,102 A | 11/1996 | Goodfellow et al. |
| 5,923,555 A | 7/1999 | Bailey et al. |

(Continued)

FOREIGN PATENT DOCUMENTS

| | | |
|---|---|---|
| CA | 2725719 A1 | 6/2012 |
| EP | 2082656 A1 | 7/2009 |

(Continued)

OTHER PUBLICATIONS

Int'l Search Report and Written Opinion for PCT/US2015/067888 dated Jul. 8, 2016 (16 pages).

(Continued)

*Primary Examiner* — G. Bradley Bennett
(74) *Attorney, Agent, or Firm* — McAndrews, Held & Malloy, Ltd.

(57) ABSTRACT

Methods and systems are provided herein for measuring 3D apparatus (e.g., manual tool or tool accessory) orientation. Example implementations use an auto-nulling algorithm that incorporates a quaternion-based unscented Kalman filter. Example implementations use a miniature inertial measurement unit endowed with a tri-axis gyro and a tri-axis accelerometer. The auto-nulling algorithm serves as an in-line calibration procedure to compensate for the gyro drift, which has been verified to significantly improve the estimation accuracy in three-dimensions, especially in the heading estimation.

22 Claims, 11 Drawing Sheets

Torch orientations for different weld types in the GTAW process: (*A*) butt welds; (*B*) lap joint; (*C*) T-joint; and (*D*) corner joint.

(56) References Cited

U.S. PATENT DOCUMENTS

| | | | |
|---|---|---|---|
| 5,932,123 | A | 8/1999 | Marhofer et al. |
| 5,978,090 | A | 11/1999 | Burn et al. |
| 6,242,711 | B1 | 6/2001 | Cooper |
| 7,534,005 | B1 | 5/2009 | Buckman |
| 7,926,118 | B2 | 4/2011 | Becker et al. |
| 7,962,967 | B2 | 6/2011 | Becker et al. |
| 8,274,013 | B2 | 9/2012 | Wallace |
| 8,316,462 | B2 | 11/2012 | Becker et al. |
| 8,464,433 | B1* | 6/2013 | Cardarelli ............ G01C 19/38 33/318 |
| 8,502,866 | B2 | 8/2013 | Becker et al. |
| 8,569,655 | B2 | 10/2013 | Cole |
| 8,605,008 | B1 | 12/2013 | Prest et al. |
| 8,680,434 | B2 | 3/2014 | Stoger et al. |
| 8,915,740 | B2 | 12/2014 | Zboray et al. |
| 8,934,029 | B2 | 1/2015 | Nayar et al. |
| 8,957,835 | B2 | 2/2015 | Hoellwarth |
| 8,992,226 | B1 | 3/2015 | Leach et al. |
| 2006/0090358 | A1* | 5/2006 | Campbell ............ G01C 23/005 33/356 |
| 2007/0187378 | A1 | 8/2007 | Karakas |
| 2008/0190900 | A1* | 8/2008 | Zhang .................. B23K 9/0953 219/121.45 |
| 2009/0276930 | A1 | 11/2009 | Becker et al. |
| 2009/0298024 | A1 | 12/2009 | Batzler et al. |
| 2010/0223706 | A1 | 9/2010 | Becker et al. |
| 2010/0251557 | A1* | 10/2010 | Albo ...................... F41G 3/02 33/318 |
| 2011/0066392 | A1* | 3/2011 | Judd ..................... G01C 17/38 702/93 |
| 2011/0117527 | A1 | 5/2011 | Conrardy et al. |
| 2011/0187859 | A1 | 8/2011 | Edelson |
| 2011/0220619 | A1 | 9/2011 | Mehn |
| 2011/0239476 | A1* | 10/2011 | Ekchian .................. G01C 9/06 33/301 |
| 2012/0180180 | A1 | 7/2012 | Steve et al. |
| 2012/0203487 | A1 | 8/2012 | Johnson |
| 2012/0255188 | A1* | 10/2012 | Tang ................... B66C 13/063 33/333 |
| 2013/0081293 | A1 | 4/2013 | Delin et al. |
| 2013/0206740 | A1 | 8/2013 | Pfeifer et al. |
| 2013/0206741 | A1 | 8/2013 | Pfeifer et al. |
| 2013/0208569 | A1 | 8/2013 | Pfeifer et al. |
| 2013/0215281 | A1 | 8/2013 | Hobby et al. |
| 2013/0291271 | A1 | 11/2013 | Becker et al. |
| 2014/0059730 | A1 | 3/2014 | Kim |
| 2014/0134579 | A1 | 5/2014 | Becker |
| 2014/0134580 | A1 | 5/2014 | Becker |
| 2014/0182148 | A1* | 7/2014 | Heikkinen ............ G01C 17/28 33/303 |
| 2014/0185282 | A1 | 7/2014 | Hsu et al. |
| 2014/0205976 | A1 | 7/2014 | Peters et al. |
| 2014/0263224 | A1 | 9/2014 | Becker |
| 2014/0272835 | A1 | 9/2014 | Becker |
| 2014/0272836 | A1 | 9/2014 | Becker |
| 2014/0272837 | A1 | 9/2014 | Becker |
| 2014/0272838 | A1 | 9/2014 | Becker |
| 2015/0009316 | A1 | 1/2015 | Baldwin |
| 2015/0072323 | A1 | 3/2015 | Postlethwaite et al. |
| 2015/0125836 | A1 | 5/2015 | Daniel et al. |
| 2015/0154884 | A1 | 6/2015 | Salsich et al. |
| 2015/0248845 | A1 | 9/2015 | Postlethwaite et al. |
| 2015/0304538 | A1 | 10/2015 | Huang |
| 2016/0153767 | A1* | 6/2016 | Ihlenfeldt ............ G01B 11/005 33/503 |

FOREIGN PATENT DOCUMENTS

| | | |
|---|---|---|
| WO | 2008/101379 A1 | 8/2008 |
| WO | 2009/137379 A1 | 11/2009 |
| WO | 20130122805 A1 | 8/2013 |

OTHER PUBLICATIONS

Fong W T et al: "Methods for in-field user calibration of an inertial measurement unit without external equipment; Methods for in-field user calibration of an IMU without external equipment", Measurement Science and Technology, IOP, Bristol, GB, vol. 19, No. 8, Aug. 1, 2008 (Aug. 1, 2008), p. 85202, XP020144339, ISSN: 0957-0233 section 4.

Tedaldi David et al: "A robust and easy to implement method for IMU calibration without external equipments", 2014 IEEE International Conference on Robotics and Automation (ICRA), IEEE, May 31, 2014 (May 31, 2014), pp. 3042-3049, XP032650121, DOI: 10.1109/ICRA.2014.6907297 sections III and IV.

Isaac Skog et al: "Calibration of a MEMs Inertial Measurement Unit", XVII Imeko World Congress Metrology for a Sustainable Development, Sep. 17, 2006 (Sep. 17, 2006), XP055268002, Retrieved from the Internet: URL:http://www.imeko.org/publications/wc-2006/PWC-2006-TC3-017u.pdf [retrieved on Apr. 22, 2016] section 3.

Intelligenter Schweißbrenner, Intelligent Welding Torch, IP Bewertungs AG (IPB) (12 pages).

Intelligent Robotic Arc Sensing, Lincoln Electric, Oct. 20, 2014, http://www.lincolnelectric.com/en-us/support/process-and-theory/pages/intelligent-robotic-detail.aspx (3 pages).

LiveArc™ Welding Performance Management System, A reality-based recruiting, screening and training solution, MillerWelds.com 2014 (4 pages).

Handheld Welding Torch with Position Detection technology description, Sep. 21, 2011 (11 pages).

Frank Shaopeng Cheng (2008). Calibration of Robot Reference Frames for Enhanced Robot Positioning Accuracy, Robot Manipulators, Marco Ceccarelli (Ed.), ISBN: 978-953-7619-06-0, InTech, Available from: http://www.intechopen.com/books/robot_manipulators/calibration_of_robot_reference_frames_for_enhanced_robot_positioning_accuracy (19 pages).

Lutwak, Dr. Robert, Micro-Technology for Positioning, Navigation, and Timing Towards PNT Everywhere and Always Stanford PNT Symposium, Stanford, CA Oct. 29, 2014 (26 pages).

Lutwak, Dr. Robert, DARPA, Microsystems Tech. Office, Micro-Technology for Positioning, Navigation, and Timing Towards PNT Everywhere and Always, Feb. 2014 (4 pages).

Pamian, Neda et al., Integration of a Multi-Camera Vision System and Strapdown Inertial Navigation System (SDINS) with a Modified Kalman Filter, Sensors 2010, 10, 5378-5394; doi: 10.3390/s100605378 (17 pages).

Pipe-Bug, Motorized & Manual Chain Driven Pipe Cutting Machines From Bug-O Systems (4 pages).

Electronic speckle pattern interferometry Wikipedia, the free encyclopedia (4 pages).

Rivers, et al., Position-Correcting Tools for 2D Digital Fabrication (7 pages).

Wavelength Selective Switching, http://en.wikipedia.org/wiki/wavelength_selective_switching, Mar. 4, 2015 (5 pages).

Cavilux® HF, Laser Light for High-Speed Imaging, See What You Have Missed (2 pages).

Cavilux® Smart, Laser Light for Monitoring and High Speed Imaging, Welcome to the Invisible World (2 pages).

Windows 10 to Get 'Holographic' Headset and Cortana, BBC News, www.bbc.com/news/technology-30924022, Feb. 26, 2015 (4 pages).

Daqri Smart Helmet, The World's First Wearable Human Machine Interface, Brochure (9 pages).

Li, Larry, Time-of-Flight Camera—An Introduction, Technical White Paper, SLOA190B—Jan. 2014, revised May 2014 (10 pages).

Heston, Tim, Lights, camera, lean—recording manufacturing efficiency, The Fabricator, Aug. 2010 (4 pages).

Telops, Innovative Infrared Imaging, HDR-IR High Dynamic Range IR Camera, http://www.telops.com/en/infrared-cameras/hdr-ir-high-dynamic-range-ir-camera, 2015 (2 pages).

OV10642: 1.3-Megapixel OmniHDRTM, http://www.ovt.com/applications/application.php?id=7 (2 pages).

(56) References Cited

OTHER PUBLICATIONS

Altasens—Wide Dynamic Range (WDR), http://www.altasens.com/index.php/technology/wdr (1 page).
HDR Camera for Industrial and Commercial Use, Invisual E Inc., http://www.invisuale.com/hardware/hdr-camera.html (2 pages).
NIT, Magic Technology—White Paper, Scene Contrast Indexed Image Sensing with WDR (14 pages).
Ni, Yang, et al., A CMOS Log Image Sensor with On-Chip FPN Compensation (4 pages).
NIT, Application Note: Native WDRTM for your Industrial Welding Applications, www.new-imaging-technologies.com (2 pages).
Reverchon, J.L., et al. New InGaAs SWIR Imaging Solutions from III-VLab, New Imaging Technologies (10 pages).
Ni, Y. et al. A 768x576 Logarithmic Image Sensor with Photodiode in Solar Cell Mode, New Imaging Technologies (4 pges).
NIT, 8Care12004-02-B1 Datasheet, New Imaging Technologies (9 pages).
NIT, NSC1005, Datasheet, Revised Nov. 2012, NSC1005 HD ready Logarithmic CMOS Sensor (28 pages).
NIT Image Processing Pipeline for Lattice HDR-6-, NIP, Pipeline, IP_NIT_NSC1005C_HDR60_V1_0 (23 pages).
NIT Image Processing Pipeline for Lattice HDR-60, NIP IP Pipeline, NIT_HDR60_V1_0_Pipeline_Sample (48 pages).
NIT, WiDySwire, New Imaging Technologyies (7 pages).
NIT Image Processing Pipeline, R&D Report N° RD1220-Rev B, May 14, 2012 (10 pages).
NIT Color Management, R&D Report N° RD1113-Rev B, Apr. 11, 2011 (31 pages).

* cited by examiner

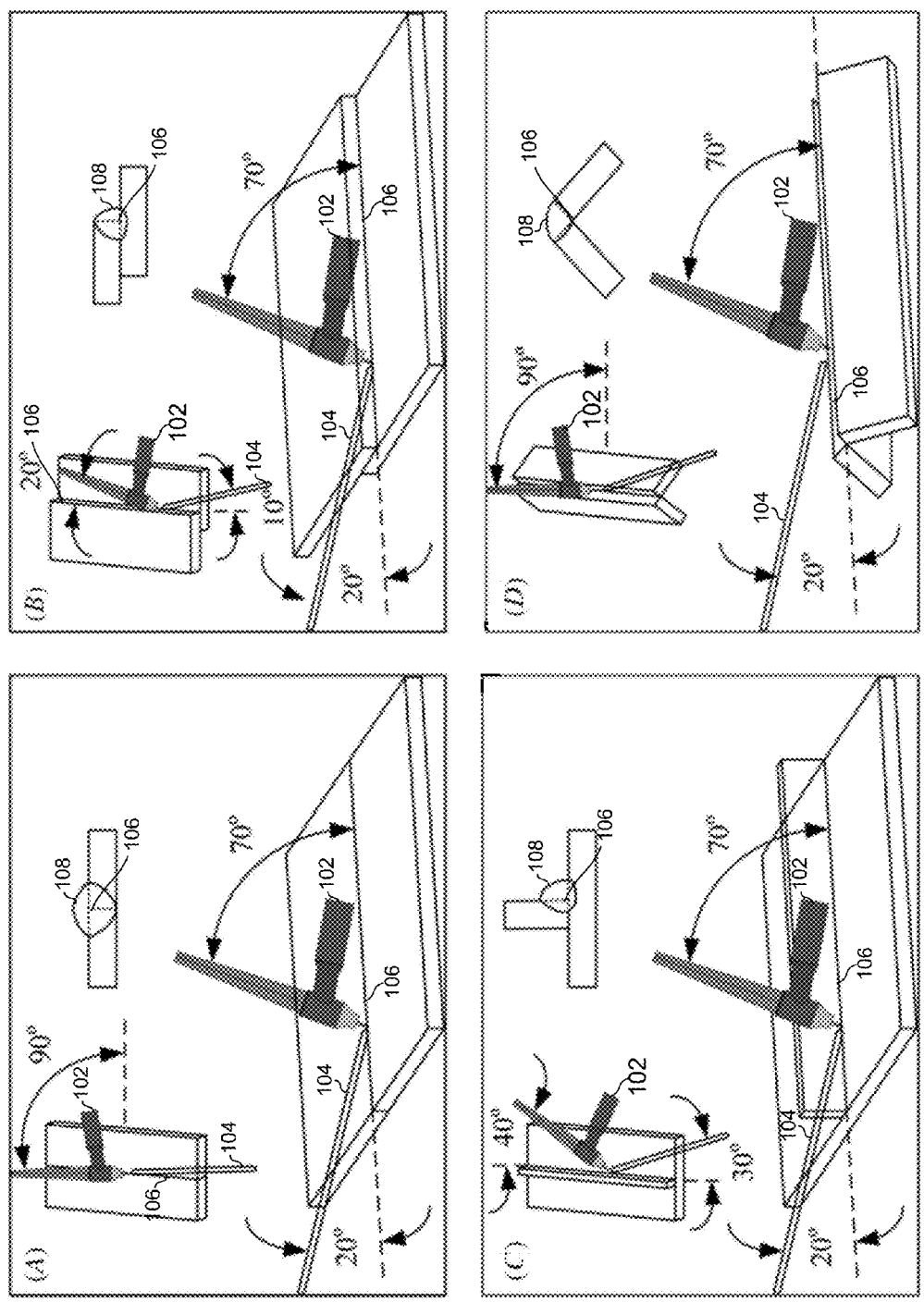
Figure 1. Torch orientations for different weld types in the GTAW process: (*A*) butt welds; (*B*) lap joint; (*C*) T-joint; and (*D*) corner joint.

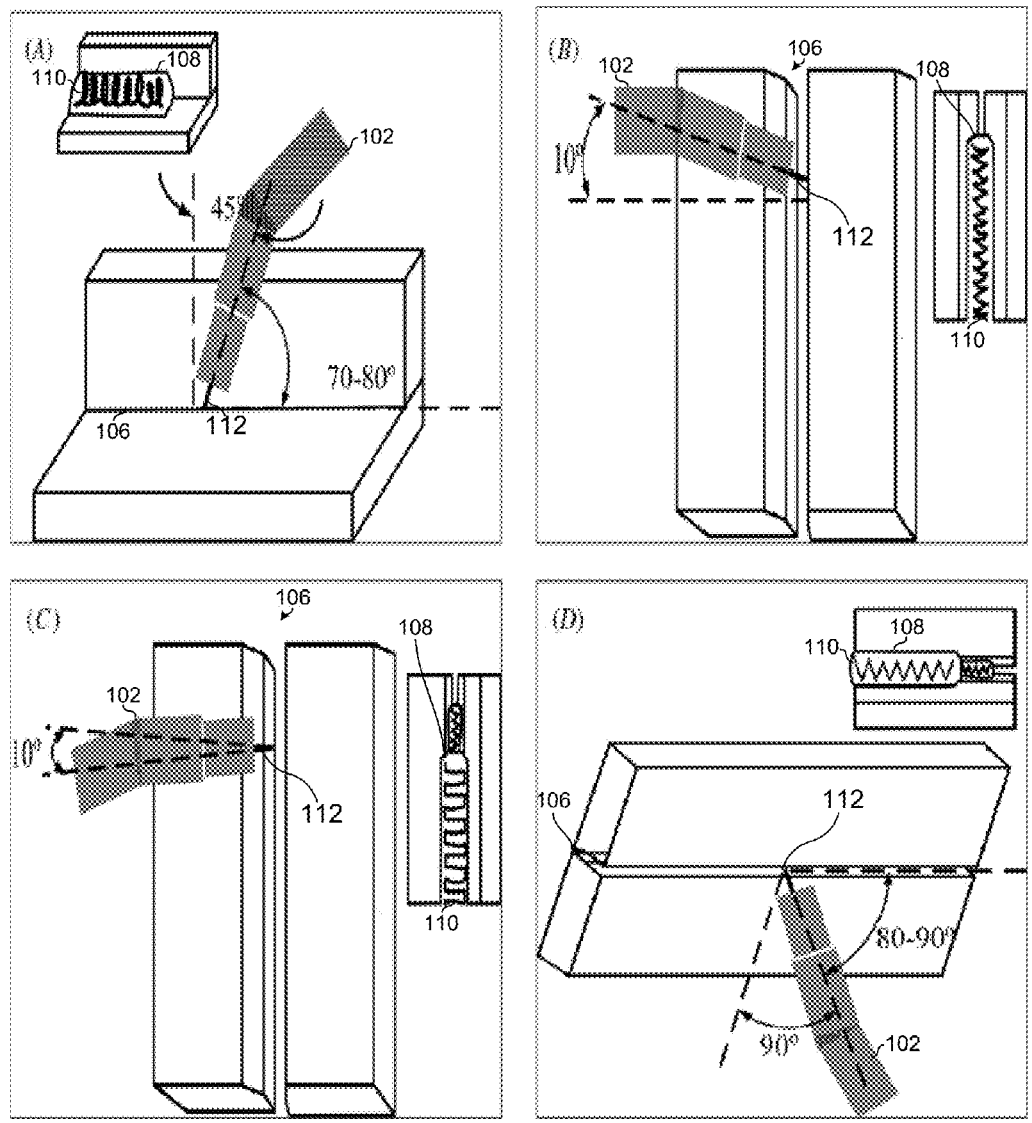
Figure 2. Torch orientations for different weld types in non- and low-alloyed steel in the GMAW process: (A) 2F/PB-horizontal–vertical fillet; (B) 3G↑/PF-vertical up root pass and (C) fill passes; and (D) 4G/PE-overhead.

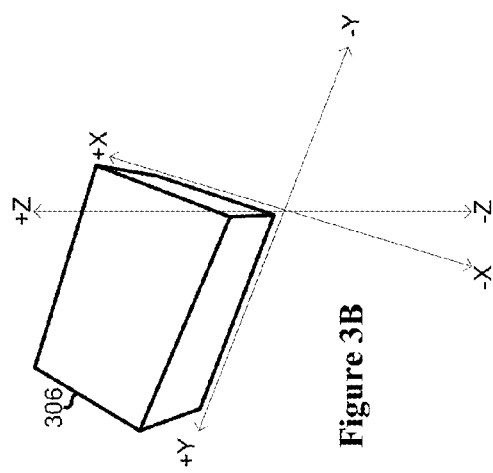
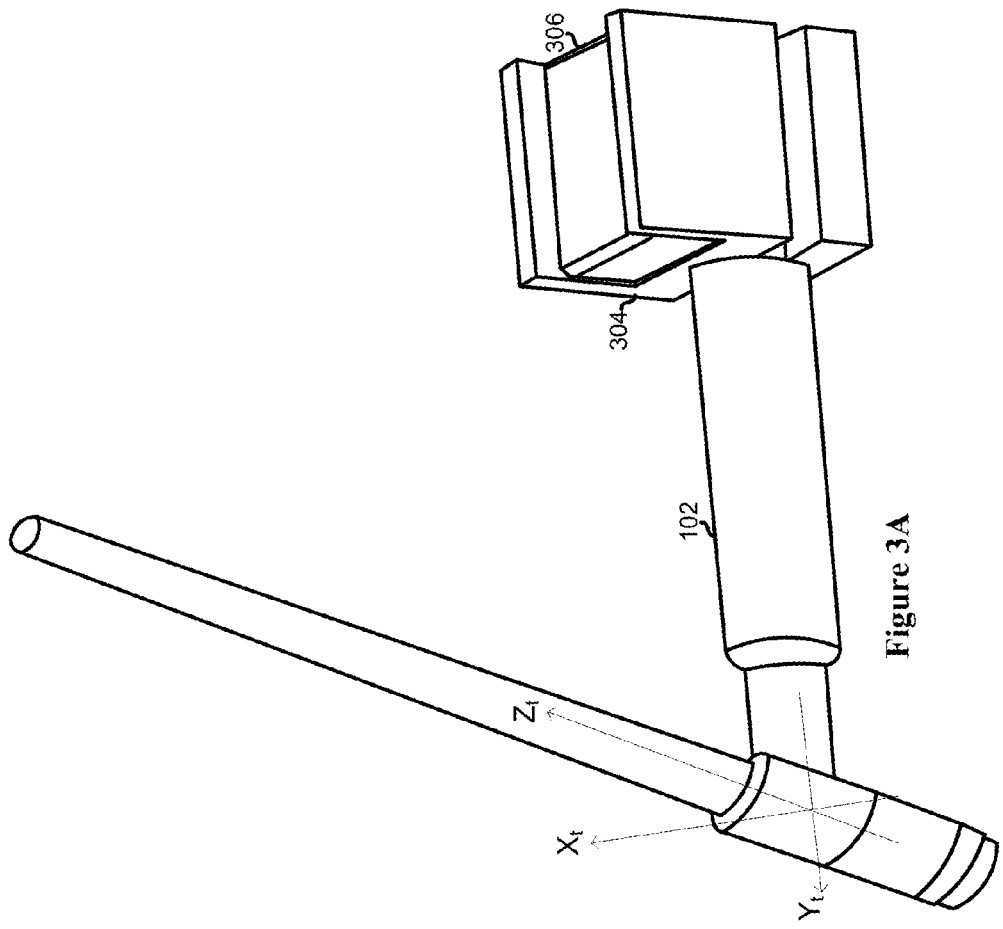

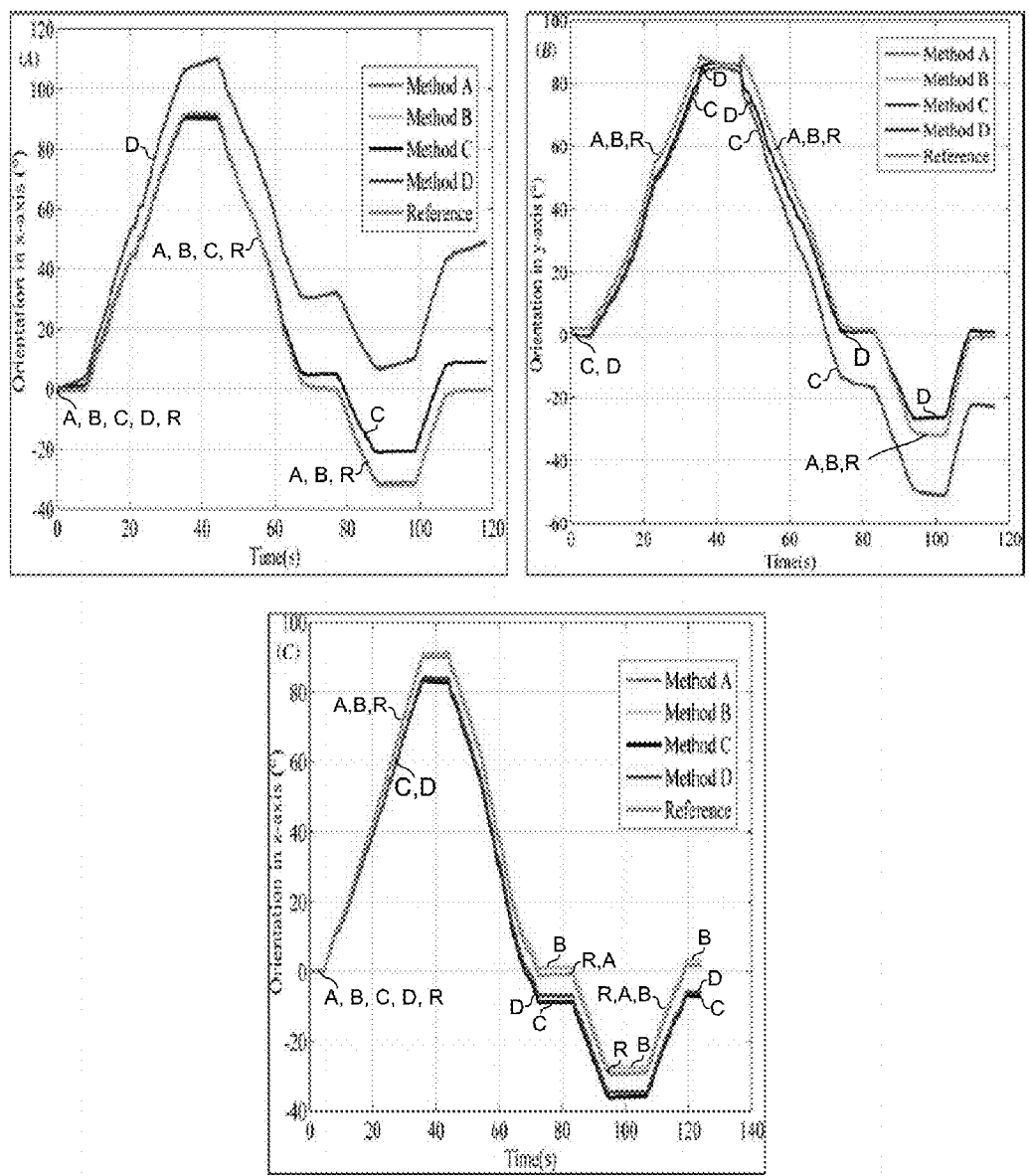
Figure 4. Estimated and reference orientation (in Euler angle) at a sampling rate of fs = 128 Hz for (A) the x-axis using data set $D_1^s$, (B) the y-axis using data set $D_2^s$, and (C) the z-axis using data set $D_3^s$3.

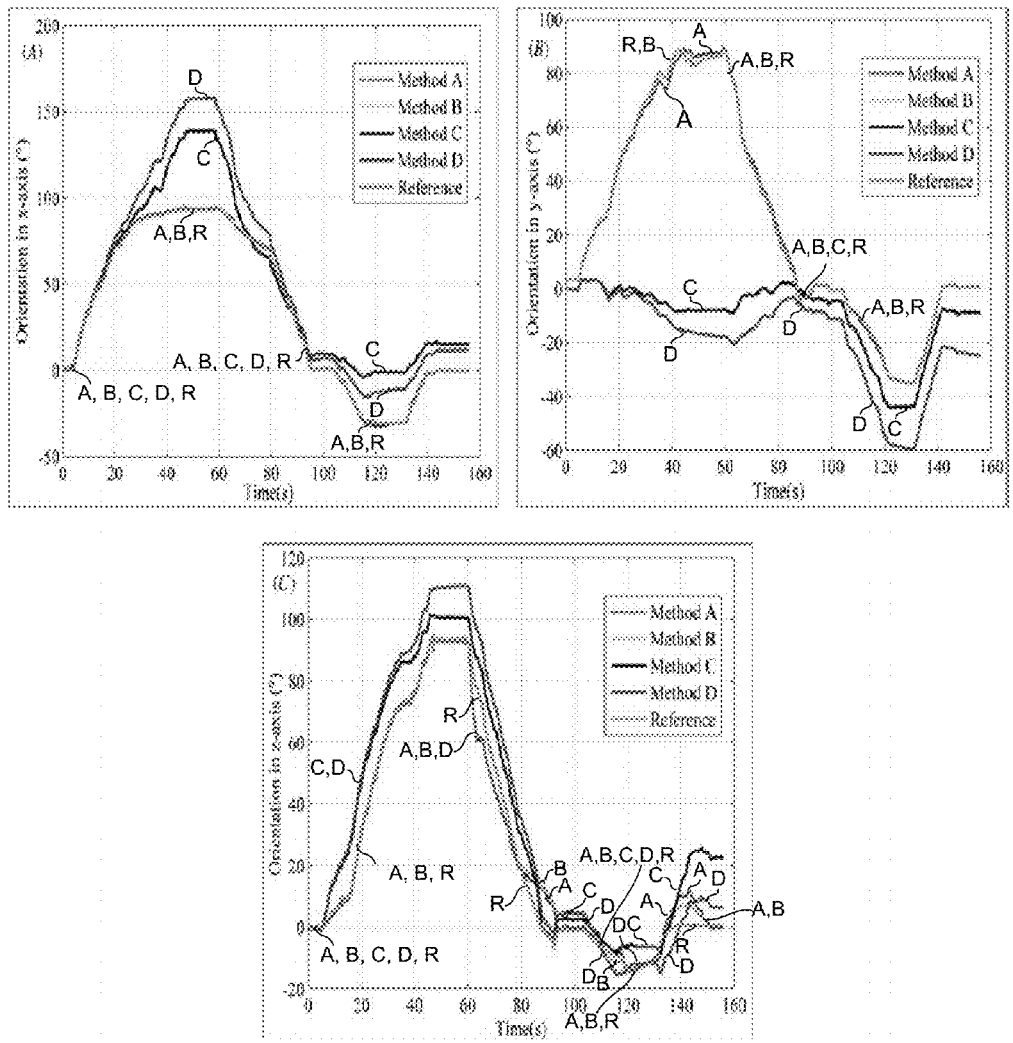
Figure 5. The RMSEs of orientation in the Euler angle at a sample rate of fs = 51.2 Hz for (A) $RMSE_x$, (B) $RMSE_y$ and (C) $RMSE_z$ using data set $D_4^2$.

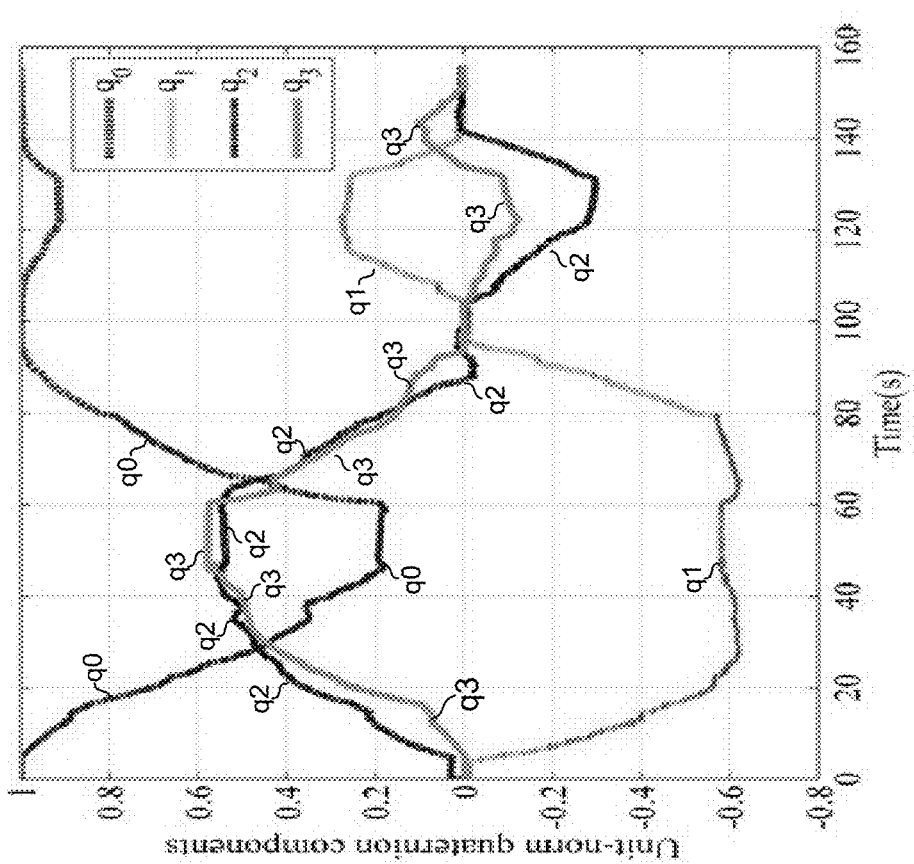
Figure 6. The obtained unit-norm quaternion of rotation from data set $D_4^s$ using method A at a sampling rate fs = 51.2 Hz. The quaternion components are dimensionless.

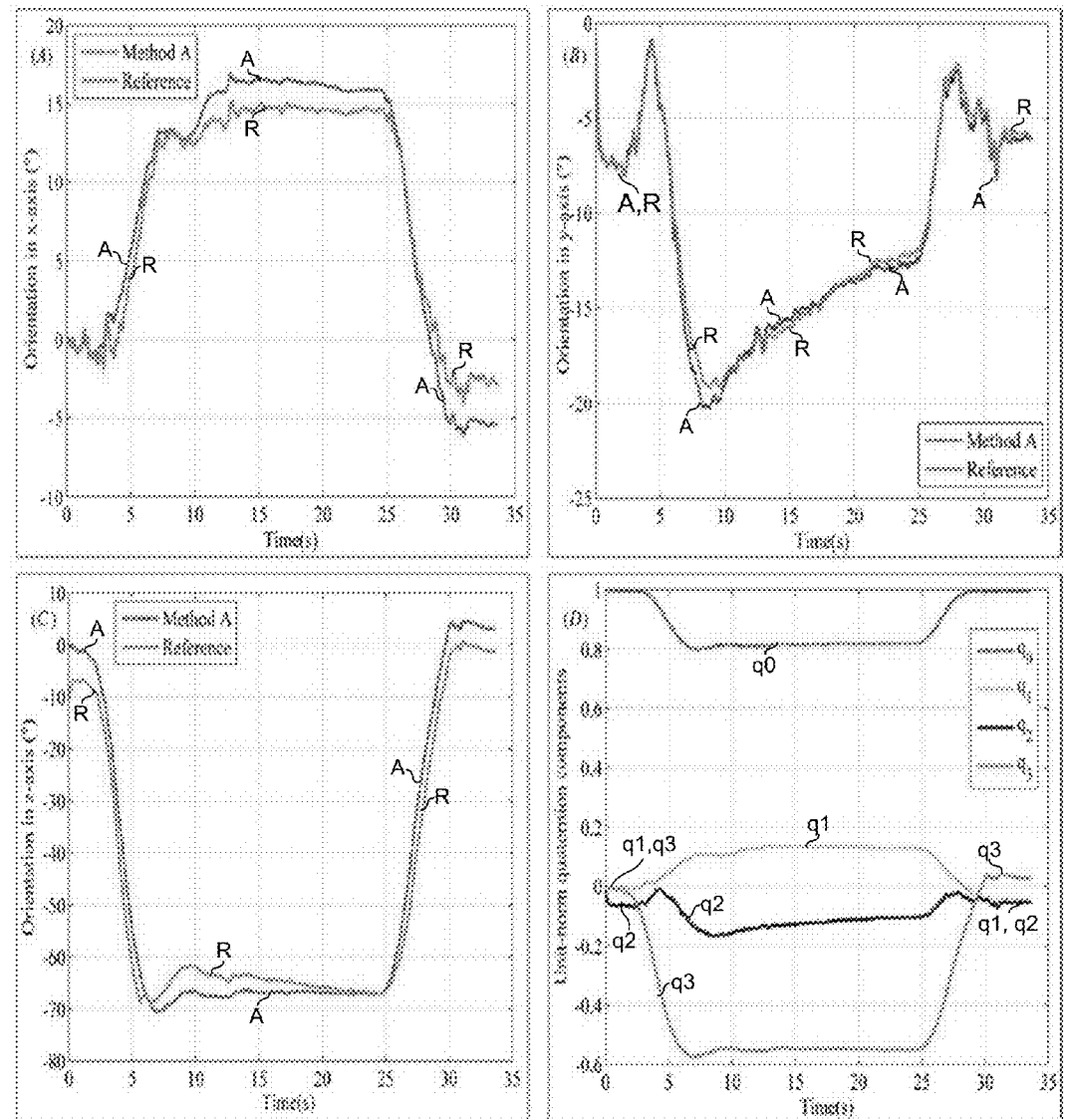
Figure 7. Orientation estimations in (A) the x-axis, (B) the y-axis and (C) the z-axis, and (D) the unit-norm quaternion components in a GTAW experiment using method A. The used data set is $D_1^e$. The weld type is a lap joint corresponding to figure 1(B).

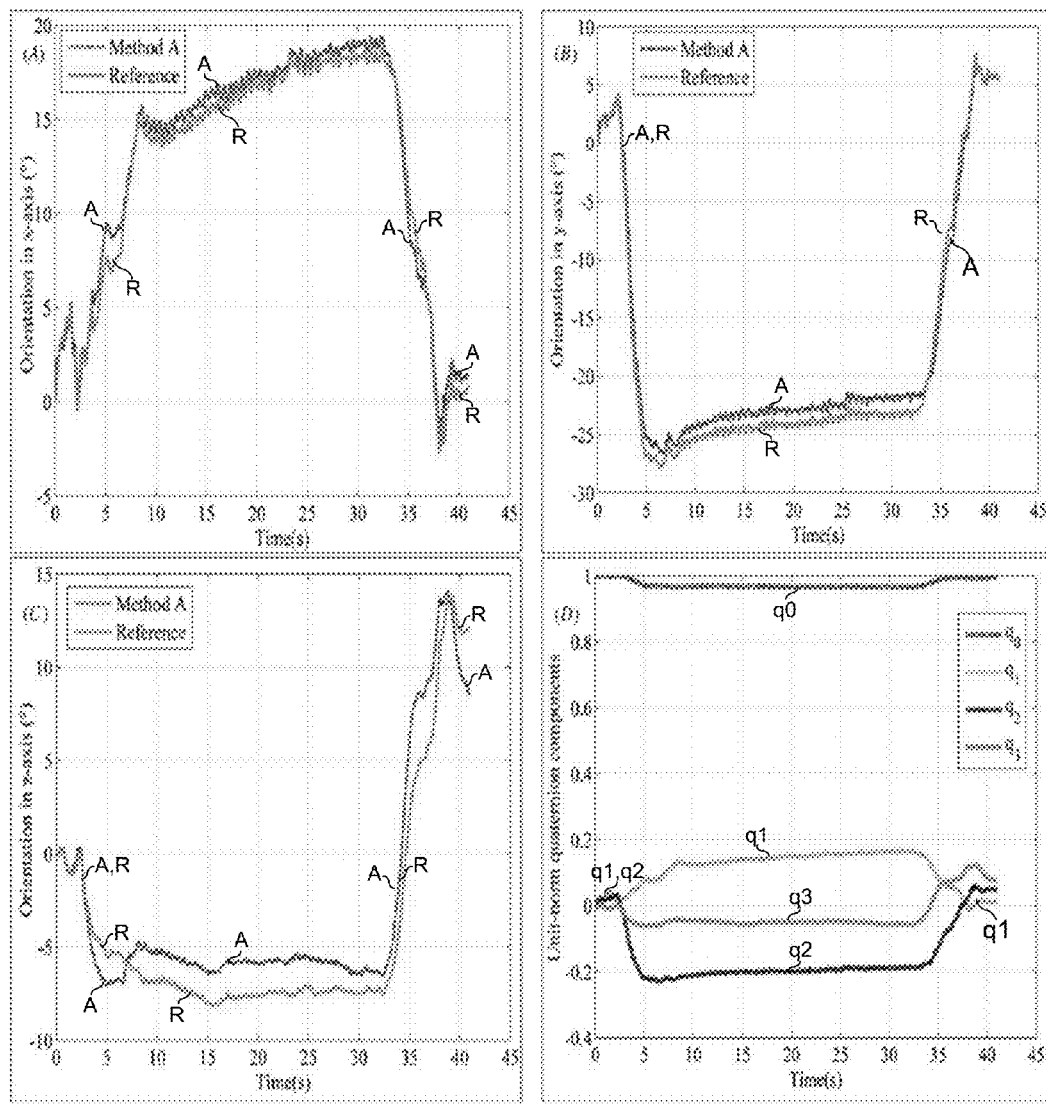
Figure 8. Orientation estimations in (A) the x-axis, (B) the y-axis and (C) the z-axis, and (D) the unit-norm quaternion components in a GMAW experiment using method A. The used data set is $D_2^e$. The weld type is a horizontal–vertical fillet corresponding to figure 2(A).

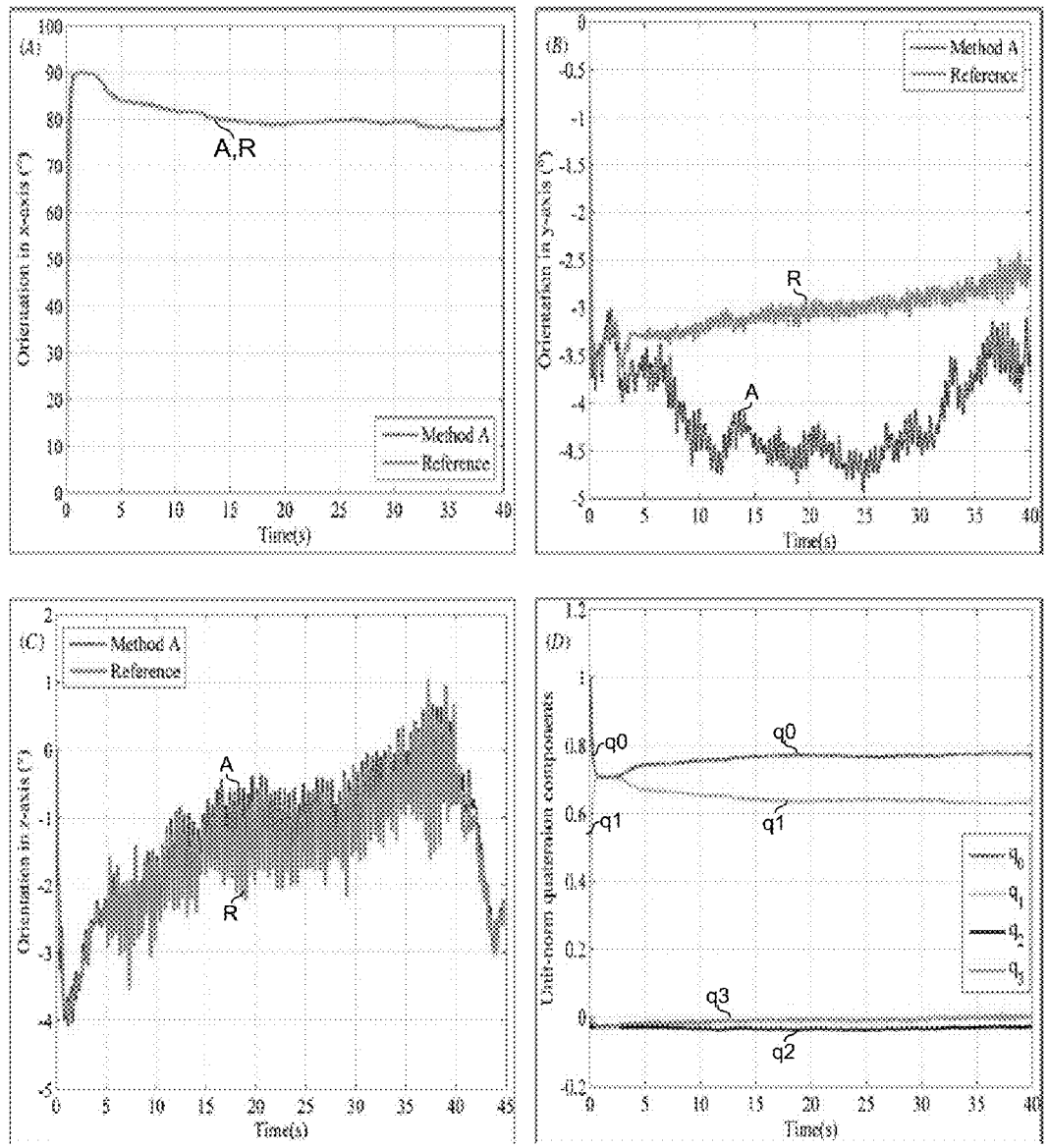
Figure 9. Orientation estimations in (A) the x-axis, (B) the y-axis and (C) the z-axis, and (D) the unit-norm quaternion components in one GMAW experiment using method A. The used data set is $D_2^e$. The weld type is a vertical up root pass corresponding to figure 2(B).

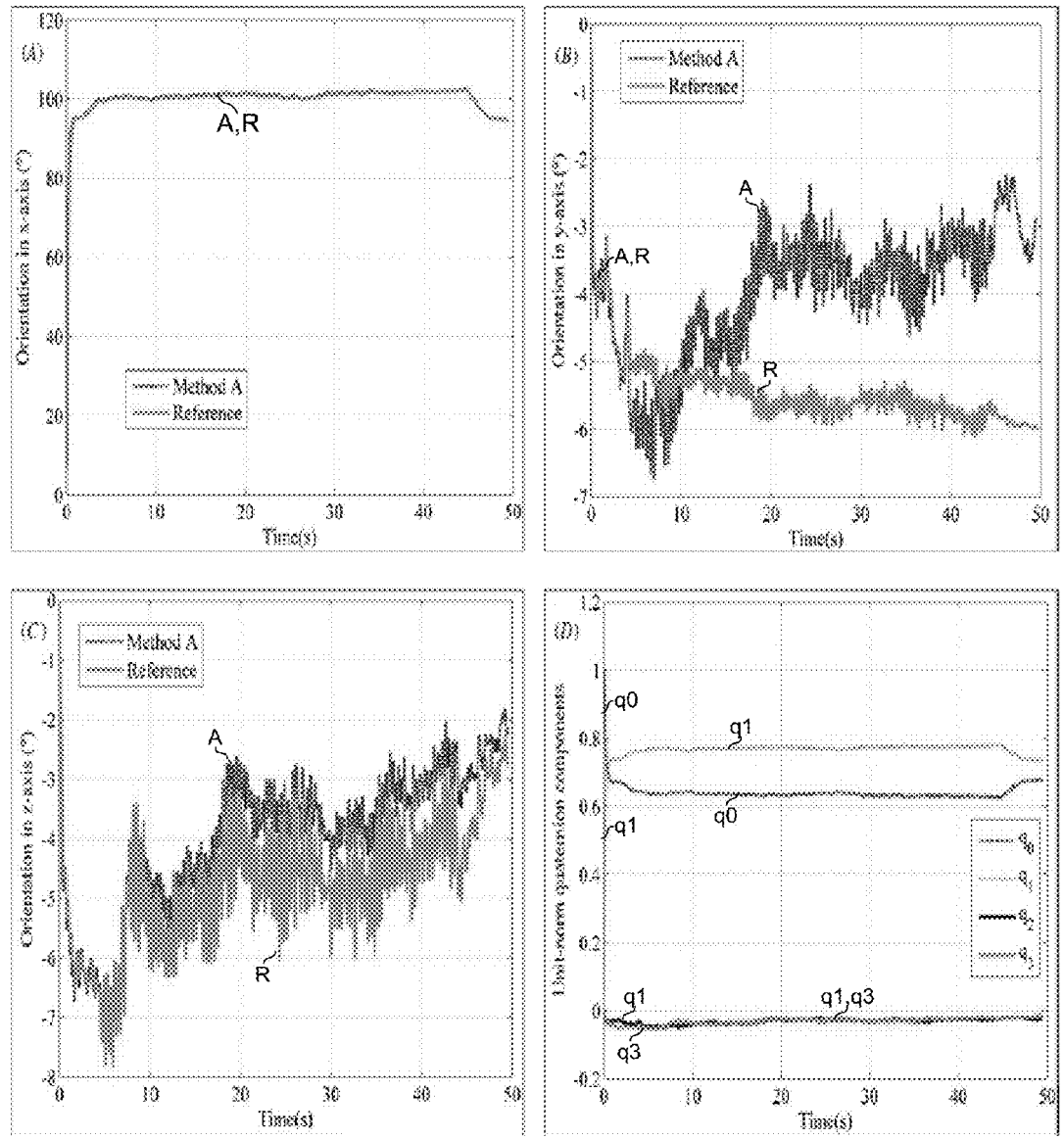
Figure 10. Orientation estimations in (A) the x-axis, (B) the y-axis and (C) the z-axis, and (D) the unit-norm quaternion components in a GMAW experiment using method A. The used data set is $D_2^e$. The weld type is a vertical up root pass corresponding to figure 2(C).

MEASUREMENT OF THREE-DIMENSIONAL WELDING TORCH ORIENTATION FOR MANUAL ARC WELDING PROCESS

PRIORITY CLAIM

This application claims priority to U.S. provisional patent application 62/099,859 titled "Measurement of Three-Dimensional Welding Torch Orientation for Manual Arc Welding Process" filed on Jan. 5, 2015, which is hereby incorporated herein by reference:

FEDERALLY SPONSORED RESEARCH

This invention was made with government support under CMMI-0927707 awarded by National Science Foundation. The government has certain rights in the invention.

BACKGROUND

Arc welding has been developed and refined for years, as one of the most widely used material joining technologies. High-quality welds are critical for many applications, such as automobile manufacturing, refineries and ship building. The torch orientation is defined as the torch posture throughout a welding process. It is one of the most important welding parameters, and is directly contingent upon the weld quality and appearance. Optimal quality welds can only be guaranteed if the torch orientation is well adjusted. Inappropriate torch manipulations cause various weld defects and discontinuities, such as poor penetration, undercuts, porosity and different types of cracks. Therefore, detailed torch orientations for almost every welding process have been recommended by various bodies and organizations.

Limitations and disadvantages of conventional approaches to manual welding will become apparent to one of skill in the art, through comparison of such approaches with some aspects of the present method and system set forth in the remainder of this disclosure with reference to the drawings.

BRIEF SUMMARY

Methods and systems are provided for measurement of three-dimensional welding torch orientation for manual arc welding process, substantially as illustrated by and/or described in connection with at least one of the figures, as set forth more completely in the claims.

BRIEF DESCRIPTION OF THE DRAWINGS

FIG. 1 shows torch orientations for different weld types in the gas tungsten arc welding (GTAW) process.

FIG. 2 shows torch orientations for different weld types in non- and low-alloyed steel in the GMAW process.

FIGS. 3A-3C illustrate an example torch and IMU, which is rigidly mounted on the torch handle by a hard plastic fixture.

FIGS. 4-10 show results of various experiments performed using an example torch and IMU in accordance with aspects of this disclosure.

DETAILED DESCRIPTION

Figure 3C:
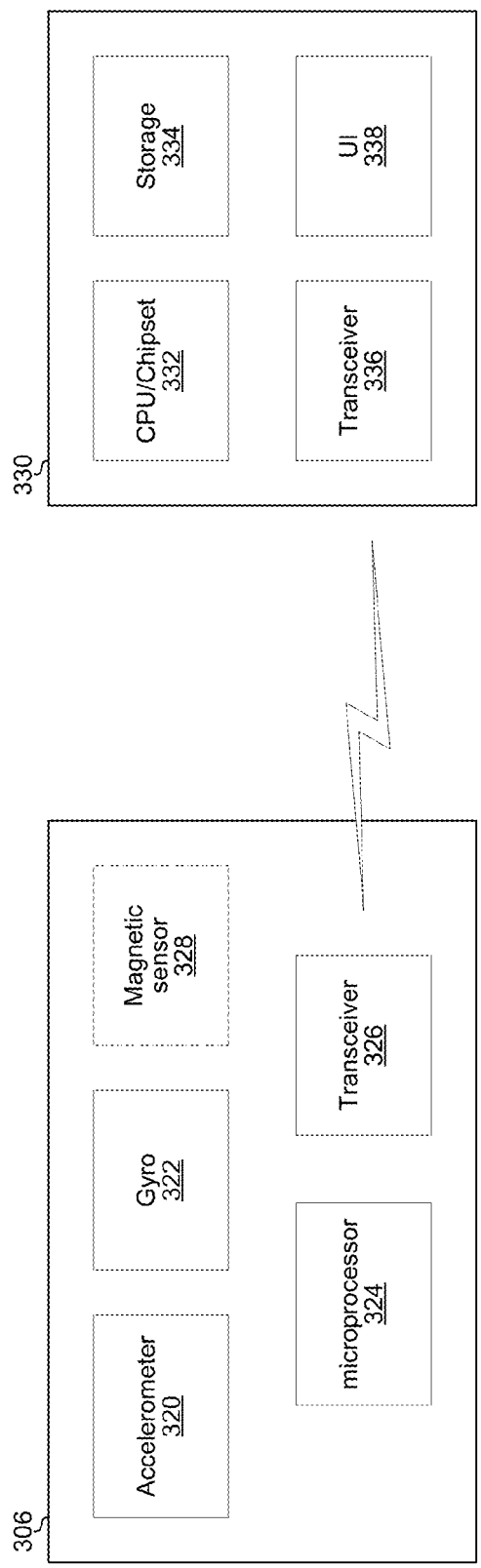

Different welding processes may have various parameters such as the welding current, voltage, torch traveling speed, wire feed speed if applicable and the number of weld passes. The recommended torch orientation manipulations can differ accordingly. Typical recommended torch postures are shown in FIGS. 1 and 2 for the two widely used welding processes which have torch orientation requirements: gas tungsten arc welding (GTAW) and gas metal arc welding (GMAW), in FIGS. 1 and 2, respectively. Four different fit-up types for each process are illustrated in the two figures. For the GTAW process of FIG. 1, there is shown torch 102, electrode 104, seam 106, and weld bead 108 for each of the fit-up types. For the GMAW process of FIG. 2, there is shown torch 102, seam 106, weld bead 108, and wire 112 for each of the fit-up types. Moreover, four different torch swing patterns 110 are adopted for the four fit-up types in FIG. 2, besides the diversities in torch orientation.

Mastering the torch manipulation is challenging in a manual arc welding process. To ensure weld quality, a human welder is required to maintain a recommended torch posture while moving the torch smoothly along the weld seam, possibly with one particular swing pattern. Due to various disturbances in the welding field, the torch is required to be adjusted accordingly to guard against the effects of the disturbances to the weld quality. The capability of proper torch orientation manipulation depends on the welder's skill level and his/her physiological conditions. The major problem is that a welder cannot master the torch adjusting maneuver without countless hours of practice through acquired rule-of-thumb techniques, and this makes the welder training cycle intolerably long. In addition, the needed concentration from the welder is always required but can never be assured.

Torch orientation measurement can be used to accelerate the welding training process. A database of welding experts' performance can be established using the torch manipulation data combined with other critical welding parameters. With the database, the operations of a welding trainee can be compared with the expert's performance throughout the practice by detecting the torch orientation in real-time, and incorrect or unfavorable operations from the trainee can be identified immediately. Audio or visual indications can thus be provided to the trainee as instant performance feedback throughout the training practice. It has been found that welding skills increase significantly with this feedback.

Detecting the torch manipulation may also open the door to better understanding of the intelligent welding operations of skilled welders. Given that a skilled welder's torch maneuvers are detected, the dynamics of the torch orientation related to the weld quality control can be obtained. The mathematical formulation of the experts' welding skills, which make an experienced welder better than an unskilled welder in delivering quality weld, can be further established. Applying the formulated skill to automatic welding will build the foundation for the next generation of intelligent welding robots that possess disturbance-resistant capabilities comparable to a skilled human welder. Another possibility is to compensate the error in torch orientation manipulation by adjusting other welding parameters that can be changed by the welding power supply.

Aspects of the methods and systems disclosed herein provide an accurate three-dimensional (3D) torch orientation measurement scheme that can be conveniently used in a real manual arc welding process or a welder training system. For illustration, this disclosure makes reference to an example implementation that is based on a miniature inertial measurement unit (IMU), and uses a quaternion-based unscented Kalman filter (UKF) and an auto-nulling algorithm. The UKF is designed to estimate the 3D orientation with the rotation quaternion included in its state vector. An innovative auto-nulling algorithm described herein captures and compensates the gyro drift based on the gyro's own output without requiring extra information from an accelerometer. The UKF incorporated with the auto-nulling algorithm provides a complete 3D estimation with a reasonable accuracy, without the aid of a magnetometer whose function may be affected during welding. The detection of human welders' torch manipulation is the foundation of studying their experienced behavior during the arc welding process, which has been extensively studied by the inventors. It is the core to understanding the difference between skilled and unskilled welders and can be utilized in accelerating the welder training process and developing next generation of intelligent welding robots. By simulations and experimental validation with torch motion signals captured from the real arc welding process, improvements in the accuracy of orientation estimation are demonstrated herein as compared with other orientation estimation counterparts.

The IMU 306 used in the example implementation is shown in FIGS. 3A-C. In an example implementation it is a Shimmer motion sensor, but other IMU sensors, either wired or wireless, may also be used without affecting the algorithms that process the signals from the sensor to compute the orientation in any ways. The size of the example IMU 306 used for the experiments described herein is about 53 mm×32 mm×19 mm. It is an IMU with wireless capability which is composed of a tri-axial accelerometer 320 (Freescale MMA7260Q), a tri-axial gyro sensor (InvenSense 500 series) 322, a microprocessor (MSP430F1611) 324, and a Bluetooth transceiver 326. The accelerometer 320 is endowed with one filter capacitor in each axis. The gyro sensor 322 contains three vibrating elements. The angular rate at each axis is obtained by measuring the Coriolis acceleration of the corresponding vibrating elements. The microprocessor 324 captures the sensor data using a 12-bit analog-to-digital converter (ADC) a pre-defined frequency. The Bluetooth transceiver 326 transmits the data from the IMU 306 to a computer. The calibration procedure for the sensors is performed according to known techniques.

Also shown in FIG. 3C is a host device 330 (e.g., desktop computer, laptop computer, tablet computer, smart phone, server, and/or the like) that comprises a CPU/chipset 332, storage 334, transceiver 336, and user interface circuitry 338. The transceiver 336 is configured to receive data from the transceiver 326 of the IMU 306. The CPU/chipset 332 is operable to process the data from the IMU 306 as, for example, described below in this disclosure. The data from the IMU 306 may be stored in storage 336 before and/or after it is processed by the CPU/chipset 332. The data and/or results of the processing/analysis of the data may be presented via the user interface circuitry 338. The CPU/chipset 332 may also be operable to generate feedback/control signals based on the data. Such signals may be conveyed (e.g., via transceiver 336) to the torch 102, a welding power source, a welding wire feeder, and/or other welding equipment to provide feedback to the torch operator and/or automatically compensate for the orientation and/or motion of the torch 102.

A torch 102 for the GTAW process with the attached IMU 306 is illustrated in FIG. 3A. In the example shown, the IMU 306 is mounted rigidly at the tail of the torch 102 using a plastic fixture. In other implementations it may be mounted in other places/configurations anywhere as long as the operation of the torch 102 is not affected. The 3D Cartesian coordinate frame, denoted as $^S(XYZ)$, in the IMU 306 is its internal frame. It is worth noting that during, for performing the experiments described herein, the mounting process involved holding the torch 102 still such that its handle was perpendicular to the gravitation direction, with aid from external calibration tools, such as a gravimeter; the IMU 306 was installed such that the gravitational acceleration direction coincided with the $^SZ$ axis. The coordinate frame $^t(XYZ)$ is the internal frame for the torch 102. It is defined in the following manner: axis $^tZ$ coincides with the torch 102 head direction, axis $^tX$ coincides with axis $^SX$. By doing this, frame $^t(XYZ)$ can be obtained by rotating frame $^S(XYZ)$ around the $^SX$ axis for an angle denoted as $\theta_{st}$.

The orientation of the torch 102 is determined when the axis orientation of the coordinate frame $^t(XYZ)$ is obtained with respect to an absolute 3D Cartesian coordinate frame, denoted as frame $^E(XYZ)$. The negative direction of axis $^EZ$ is defined in coincidence with the local gravitational direction. The directions of the other two axes depend on the specific welding applications, which will be detailed below.

The torch 102 orientation is represented by a quaternion denoted as $_E^S\tilde{q}$ where the sign denotes a unit quaternion $\tilde{q}=[q_0, q_1, q_2, q_3]$, i.e., $$\|\tilde{q}\|=\sqrt{q_0^2+q_1^2+q_2^2+q_3^2}=1 \tag{1}$$

where $q_0$ is the scalar part and $[q_1, q_2, q_3]$ is the vectorial part of the quaternion, and where, for the quaternion denotation, a leading subscript denotes the reference frame and a leading superscript indicates the frame being described.

The tri-axial gyroscope 322 in the IMU 306 measures the angular velocity of frame $^s(XYZ)$ relative to frame $^E(XYZ)$. The measurement (in rad s$^{-1}$) can be denoted by the 1×3 row vector shown in equation (2):

$$^s\omega=[\omega_x, \omega_y, \omega_z]. \tag{2}$$

The quaternion at instant k+1 can be presented using the quaternion at instant k, angular measurement ($^s\omega_k$), and the time interval denoted by $T_s$:

$$_E^s\tilde{q}_{k+1} = {_E^s\tilde{q}_k} \otimes \exp\left(\frac{T_s}{2}\omega_k\right) \tag{3}$$

where $\otimes$ is the quaternion product, which is defined in equation (4), where a=[$a_1$ $a_2$ $a_3$ $a_4$] and b=[$b_1$ $b_2$ $b_3$ $b_4$]. Exp(.) denotes the quaternion exponential, which is defined in equation (5).

$$a \otimes b = \begin{bmatrix} a_1b_1 - a_2b_2 - a_3b_3 - a_4b_4 \\ a_1b_2 + a_2b_1 + a_3b_4 - a_4b_3 \\ a_1b_3 - a_2b_4 + a_3b_1 + a_4b_2 \\ a_1b_4 + a_2b_3 - a_3b_2 + a_4b_1 \end{bmatrix}^T \tag{4}$$

$$\exp(v) \stackrel{\Delta}{=} \left[\cos(\|v\|), \frac{v}{\|v\|}\sin(\|v\|)\right] \tag{5}$$

where v presents a 1×3 row vector. The torch orientation, $_E^t\tilde{q}$ can be calculated by equation (6).

$$_E^t\tilde{q}={_E^s\tilde{q}} \otimes \exp([\theta_{st}, 0, 0]). \tag{6}$$

The gyroscope 322 and the accelerometer 320 in the IMU 306 measure the angular velocity and the acceleration of the sensor, respectively. Besides the true values, $^S\omega_{true}$ and $^Sa_{true}$ there are several main error sources affecting the IMU 306 measurement including the bias, scale-factor instability, non-orthogonality of axes and the measurement noise. To this regard, the IMU 306 measurements are expressed in equations (7) and (8):

$$^s\omega = S_\omega^a \omega_{true} + T_\omega^a \omega^a \omega_{true} + b_\omega^a + v_\omega \quad (7)$$

$$^s a = S_a^a a_{true} + T_a^a a_{true} + b_a + v_a \quad (8)$$

where $S_\omega$ and $S_a$ are the scale-factor matrices; $T_\omega$ and $T_a$ are the non-orthogonality factor matrices; $b_\omega$ and $b_a$ are the bias; and $v_\omega$ and $v_a$ are the measurement noises. This is a simplified sensor model. Some minor error sources are not considered, such as the cross-sensitivity and gravity-sensitivity, other embodiments may account for these error sources.

Measurement noises $v_\omega$ and $v_a$ are normally considered as uncorrelated white Gaussian noises, with a null mean and 3×3 covariance matrices $^R\sigma_\omega^2 I_{3\times3}$ and $^R\sigma_a^2 I_{3\times3}$, respectively. The covariance matrix of sensor model R is $$R = \begin{bmatrix} ^R\sigma_\omega^2 I_{3\times3} & 0 \\ 0 & ^R\sigma_a^2 I_{3\times3} \end{bmatrix}. \quad (9)$$

The true acceleration measurement includes two components: the sensor acceleration and the gravitation acceleration, as expressed by equation (10):

$$^s a_{true} = {}^s a_{sensor} + {}^s g \quad (10)$$

where $^s g$ is the gravitational acceleration in the sensor frame, which can be obtained using equation (11):

$$^s g = {}_E^s \bar{q} \otimes [0, {}^E g] \otimes {}_E^s \bar{q}^s. \quad (11)$$

The torch 102 should be moved smoothly along the seam 106 with unnoticeable accelerations (including "decelerations") throughout the arc welding process, given that the skilled welder is well motivated. Thereby, in the example implementation, $^s a_{sensor}$ is insignificant compared with the gravitational acceleration and thus may be considered as a disturbance. Henceforth, equation (10) can be expressed by equation (12):

$$^s\tilde{a}_{true} \approx {}^s\tilde{g}. \quad (12)$$

Normalized gravity may be used to eliminate the measurement error caused by localized gravity differences.

The bias and the scale factors, in equations (7) and (8), depend on non-idealities of the IMU 302 and the working field. The typical bias of the gyro 322 is 0.017-0.17 rad h$^{-1}$ and the acceleration bias is about 100-1000 μg for tactical grade. In particular, the ambient temperature significantly affects the bias of the gyro 322. In the example implementation, the IMU 306 is employed near the welding arc which is a strong heat source. Hence, the bias of the gyro 322 might not be constant throughout an arc welding process. In an example implementation of this disclosure, an auto-nulling algorithm is used to compensate the drift of the gyro 322 in-line to guard the effect of the drift variation over temperature to the estimation accuracy.

The influence of temperature on the bias of the accelerometer 320 is much less intense. The in-line calibration of the accelerometer 320 may require the vector output of the accelerometer 320 to remain in a quasi-static equilibrium for several different orientations. That is, require the accelerometer 320 to be not accelerating or decelerating at more than a determined threshold. The threshold may be set to any value greater than or equal to 0. In an example implementation, the vector output of the accelerometer 320 may be lower than a determined threshold when the accelerometer 320 is in quasi-static equilibrium. However, in a typical application, the torch 102 should be held in one certain orientation, as shown in FIGS. 1 and 2, throughout the arc welding process. Therefore, there will not be enough orientations for in-line calibration. Accordingly, in the example implementation, the bias of the accelerometer 320 is assumed to be constant, and compensated for by calibration before use.

The scale-factor drifts of IMU 306 are known to affect the measurement accuracy to a much smaller extent than the bias drifts. The drift variation over temperature is also negligible. Therefore, in the example implementation, the scale factors are considered to be subjected to small variations around their average values throughout the welding process. Their nominal values may be determined through the sensor calibration before use.

The capture of the drift of the gyro 322 may require keeping the gyro 322 from rotation. The basic principle is called the zero attitude update (ZAU), also referred as auto-nulling, i.e., when no rotation occurs to the gyro 322, its output can be considered as the drift caused by the bias and other error sources. The drift can then be periodically captured and compensated for. In the example implementation, a new auto-nulling algorithm is used in which the quasi-static equilibrium status is detected using information from the gyro's own output.

The mean and deviation of the output of the gyro 322 obtained in a small time interval when the IMU 306 is set still can be used to determine whether in quasi-static equilibrium. The two variables are defined by $$\mu_s = \sum_{k=1}^{M} {}^s\omega_k / M \quad (13)$$

$$\sigma_s = \sqrt{\frac{\sum_{k=1}^{M} ({}^s\omega_k - \mu_s) * ({}^s\omega_k - \mu_s)^r}{M}} \quad (14)$$

where M is the number of samples. To record the data for calculating $\mu_S$ and $\sigma_S$, a quasi-static equilibrium data acquisition process may be conducted where the IMU 306 is set still at room temperature (about 23° C.). Before recording valid data from the gyro 322, the IMU 36 is allowed to power up for a few minutes until it reaches thermal stability.

For an arbitrary angular velocity $^S\omega_i$ recorded by the gyro 322, the corresponding mean and deviation are defined in equations (15) and (16)

$$\mu(i) = \sum_{k=i-N}^{i} {}^s\omega_k / N \quad (15)$$

$$\sigma(i) = \sqrt{\frac{\sum_{k=i-N}^{i} ({}^s\omega_k - \mu(i)) * ({}^s\omega_k - \mu(i))^r}{N}} \quad (16)$$

where i>N, and N is the number of samples of the gyroscope output gathered in a small interval $T_{au}$ right before $^S\omega_i$ is recorded. In the example implementation, $T_{au}=1$ s.

If the mean and the deviation of the output of the gyro 322 within the interval $T_{au}$ are close (within a determined threshold) to $\mu_S$ and $\sigma_S$, then the torch 102 and IMU 306 are considered to be in quasi-static equilibrium. Other methods for detecting quasi-static equilibrium are of course possible. According to the ZAU principle, the mean value, μ(i), can be thus thought of as a drift. In the example implementation, the possible ambient temperature variation caused by the welding arc is in a comparatively low rate due to the thermal latency. Therefore, the data from the gyro 322 in the time vicinity of the quasi-static equilibrium interval can be compensated using the drift obtained in the quasi-static equilibrium interval. If the IMU 306 is in a dynamic period ($\mu(i)$ or $\sigma(i)$ are much larger than $\mu_S$ and $\sigma_S$), then compensation can be accomplished by the mean value from the nearest quasi-static equilibrium interval.

Furthermore, the drift of a gyro 322 may be sensitive to temperature, as discussed above. Therefore, in an example implementation, two thermal coefficients, and $\rho_o$, are included in the auto-nulling algorithm to account for the temperature difference between the environment where the torch 102 and IMU 306 is used and the one where the quasi-static equilibrium experiment was conducted. For the simulations discussed below, they were set to 1, since the temperature at which the quasi-static equilibrium experiment was conducted was about the same as that in which the simulations were conducted. The coefficients may be pre-set and given reasonable values based on estimation results and/or empirically chosen.

Hence, if there exist $$\mu(i)^2 \leq \rho_\mu \mu_s^2 \text{ and } \sigma(i) \leq \rho_\sigma \sigma_S \qquad (17)$$

then the torch 102 and IMU 306 is considered to be in quasi-static equilibrium, and $\mu(i)$ is referred to as a valid drift.

Therefore, the auto-nulling algorithm in an example implementation can be expressed by $$^s\omega_i = \begin{cases} ^s\omega_i - \mu_s & i \leq N \\ ^s\omega_i - \mu(i) & \text{WIMU is static, } i > N \\ ^s\omega_i - \mu(\zeta) & \text{WIMU is dynamic, } i > N \end{cases} \qquad (18)$$

where $\mu(\zeta)$ is the nearest valid drift for $^s\omega_i$, $\zeta < i$.

Using the auto-nulling algorithm described above, no data is required from some external sensors to compensate for the effect of drift to the orientation estimation. The effectiveness of the algorithm will be evaluated below.

In an example implementation, the state vector of the UKF is composed of the torch orientation quaternion and the angular velocity.

$$x_k = [^s_E \tilde{q}_k, ^s\omega_k]. \qquad (19)$$

Using the state vector, the sensor model (equations (7) and (8)) can be rewritten as shown in equation (20):

$$z_{k+1} = h(x_k, v_k) \qquad (20)$$

where $z_{k+1} = [^s\omega_{k+1}, ^2a_{k+1}]$, and $v_k = [v_a, v_a]$.

The process model represented by the state vector is $$x_{k+1} = f(x_k, w_k) = [^s_E \tilde{q}_k \otimes \exp(\omega_k) \otimes \exp(w_q), ^s\omega_k + w_\omega] \qquad (21)$$

where $w_k = [w_q, w_\omega]$ is the process noise with a covariance matrix denoted as $Q_k$, $\exp(\omega_k)$ is the increment of the rotation in the kth sampling period, and $\exp(w_q)$ is the process uncertainty caused by $w_q$, which is the quaternion component of the process noise.

In the example implementation, the angular velocity is expected to be fairly small, since the torch 102 is required to be maintained in a recommended orientation with small adjustments for possible disturbances. Therefore, the angular velocity can be modeled as a random walk in the process model.

Because of the nonlinear nature of the process model (equation (21)) and the sensor model, the UKF approach is applied. The UKF algorithm is summarized below.

Given the estimated state vector $\hat{x}_{k-1}$ and its covariance $P_{k-1}$ at instant k-1, an auxiliary vector set $\{\psi_i\}$ is defined by equation (22):

$$\psi_i = \begin{cases} \left(\sqrt{(n+\lambda)\cdot(P_{k-1}+Q)}\right)_i & i = 1, \dots, n \\ -\left(\sqrt{(n+\lambda)\cdot(P_{k-1}+Q)}\right)_{(i-n)} & i = n+1, \dots, 2n \end{cases} \qquad (22)$$

where $(\sqrt{(n+\lambda)\cdot(P_{k-1}+Q)})_i$ is the ith row of the matrix square root, and $\lambda = \alpha^2(n+\kappa) - n$, in which $\alpha$ and $\kappa$ are two scaling parameters. A subtle detail worth noting is that the dimension of covariance $P_{k-1}$ is 6×6, since the degree of freedom (DOF) of the state vector is 6 (the unit quaternion constraint reduces one DOF). Therefore, the $\psi_i$s are 1×6 vectors.

UKF addresses the approximation of a nonlinear system by using a minimal set of sample points, i.e., sigma points, to capture the mean and covariance estimates. The sigma points set $\{(X_{k-1})_i\}$ is defined by $$(X_{k-1})_i = \hat{x}_{k-1} = [^s_E \tilde{q}_{k-1}, ^s\hat{\omega}_{k-1}] \qquad (23)$$

as i=0, and $$(X_{k-1})_i = \hat{x}_{k-1} + \psi_i = [^s_E \tilde{q}_{k-1} \otimes \exp(\psi_{i|q}), ^s\hat{\omega}_{k-1} + \psi_{i|\omega}] \qquad (24)$$

when i=1, ..., 2n, and $\psi_i = [\psi_{i|q}, \psi_{i|\omega}]$ in which $\Omega_{i|q}$ is the first three elements of $\psi_i$ corresponding to the quaternion part, and $\psi_{i|\omega}$ relates to the angular velocity. The length of state vector $\hat{x}_{k-1}$ is 7, while $\Omega_i$ is a six-element vector. Thereby, equation (24) performs a vector to quaternion conversion for $\Omega_{i|q}$ using the quaternion exponential in equation (5).

After the sigma points $\{(X_{k-1})_i\}$ are obtained, the process model is used to project each point ahead in time. The propagation results are shown in equation (25), and a priori state estimate is thus obtained in equation (26):

$$(\chi_k)_i = f((\chi_{k-1})_i, 0, 0) \quad \text{for } i = 0, \dots, 2n \qquad (25)$$

$$\hat{x}_k^- = \sum_{i=0}^{2n} W_i^{(m)}(\chi_k)_i \qquad (26)$$

where weights $W_i^{(m)}$ are defined by $$W_i^{(m)} = \begin{cases} \lambda/(n+\lambda) & i = 0 \\ \lambda/(2(n+\lambda)) & i = 1, \dots, 2n \end{cases}. \qquad (27)$$

The covariance of $(X_k)_i$ is $$P_k^- = \sum_{i=0}^{2n} W_i^{(c)} [(\chi_k)_i - \hat{x}_k^-]^T [(\chi_k)_i - \hat{x}_k^-] \qquad (28)$$

where weights $W_i^{(c)}$ are defined in equation (29), and $\beta$ is a scaling parameter used to incorporate prior knowledge about the distribution of state vector x. It should be noted that $P_k^-$ is a 6×6 matrix, while $\hat{x}_k$ and $\hat{x}_k^-$ are seven-element vectors. A conversion is thereby performed to the right side of the equation to transform the quaternion parts into three-element rotation vectors. This quaternion-to-rotation conversion is a reverse procedure of equation (5):

$$W_i^{(c)} = \begin{cases} \lambda/(n+\lambda) + (1-\alpha^2+\beta) & i=0 \\ \lambda/(2(n+\lambda)) & i=1,\ldots,2n \end{cases} \quad (29)$$

The results for the projected set $\{(\chi_k)_i\}$ in the sensor model are expressed by $$(y_k)_i = h((\chi_k)_i, 0, 0) \text{ for } i=0,\ldots,2n \quad (30)$$

The measurement estimate can thus be defined in equation (31):

$$\hat{z}_k^- = \sum_{i=0}^{2n} W_i^{(m)}(y_k)_i. \quad (31)$$

The a posteriori state estimate is computed using $$\hat{x}_k = \hat{x}_k^- + K_k(z_k - \hat{z}_k^-) \quad (32)$$

where $z_k$ is the measurement vector from IMU 306, and $K_k$ is the Kalman gain which is defined by $$K_k = P_{\hat{x}_k \hat{z}_k} P_{\hat{z}_k \hat{z}_k}^{-1} \quad (33)$$

The cross correlation matrix $P_{\hat{z}_k \hat{z}_k}$ and measurement estimate covariance $P_{\hat{z}_k \hat{z}_k}$ are expressed in equations (34) and (35), respectively:

$$P_{\hat{x}_k \hat{z}_k} = \sum_{i=0}^{2n} W_i^{(c)} [(\chi_k)_i - \hat{x}_k^-]^T [(y_k)_i - \hat{z}_k^-] \quad (34)$$

$$P_{\hat{z}_k \hat{z}_k} = \sum_{i=0}^{2n} W_i^{(c)} [(y_k)_i - \hat{z}_k^-]^T [(y_k)_i - \hat{z}_k^-] + R. \quad (35)$$

A quaternion-to-rotation conversion is performed to the term in the second bracket of equation (34), to ensure a valid cross correlation matrix. The estimated state covariance is updated at instant k by $$P_k = P_k^- - K_k P_{\hat{z}_k \hat{z}_k} K_k^T. \quad (36)$$

In an example implementation, for a successful UKF performance, the following parameters are required to be determined first: $Q_k$, R, $\alpha$, $\beta$, $\kappa$. Scaling parameters $\alpha$, $\beta$, $\kappa$ may be empirically pre-set and given reasonable values based on filter tests results. $^R\sigma_\omega^2 I_{3\times3}$ and $^R\sigma_a^2 I_{3\times3}$ account for the spectral density of the sensor signal while the sensor is lying still.

The process noise covariance Qk can be determined by $$Q_k = \Phi_s \int_0^{T_s} \Phi(\tau) Q' \Phi^T(\tau) d\tau \quad (37)$$

where $\Phi_s$ is a scaling parameter, $\Phi(\tau)$ is an approximation to the fundamental matrix calculated by taking the Taylor series expansion of the system dynamic matrix, and Q' is the continuous process noise matrix. The covariance matrix Q' is expressed by $$Q' = \begin{bmatrix} \Sigma_q & 0 \\ 0 & \Sigma_\omega \end{bmatrix} \quad (38)$$

Where $\Sigma_q = {}^Q\sigma_q^2 I_{3\times3}$ and $\Sigma_\omega = {}^Q\sigma_\omega^2 I_{3\times3}$ are the covariance matrix of the quaternation part and angular velocity part of the process noise, respectively, which, in the example implementation, are assumed to be uncorrelated, zero-mean white noise.

Simulations and Experiments

The orientation estimation scheme was tested using the IMU 306 detailed above. Raw data was recorded, transmitted to a desktop, and processed in accordance with aspects of this disclosure. A welding robot (Universal Robot UR 5) was used to provide reference measurements of the torch orientation. To do so, either the torch (in welding experiments) or the IMU 306 (in simulations) was rigidly mounted on the robot tool center, the center of the plane on the robot forearm. The orientation of the tool center was calculated by the imported accompanying software using the feedback from the robot. The obtained reference orientation was filtered by a second-order low-pass Butterworth filter (cut-off frequency: 15 Hz). Initial calibration was conducted to determine the quaternion for converting the tool center orientation to the torch 102 and IMU 306 orientation. The performance of the example implementation was evaluated by comparing it with the reference measurements.

The accuracy of the reference orientation delivered by the welding robots depends on the accuracy of the orientation measurement of the robot tool center and on the robot-IMU orientation calibration. The orientation measurement error of the robot can be estimated using the data supplied by the robots manufacturer. The repeatability of the robot is ±0.1 mm. The robot's shortest forearm around which the robot tool center rotates is about 89 mm. Hence, its maximum orientation error is about 0.06°, which is acceptable as a measurement reference for an example implementation.

A reference 3D Cartesian coordinate frame $^E(XYZ)$ was defined to justify valid orientation measurements: the z-axis is defined above; the x-axis and y-axis were arbitrarily defined by the right-hand rule. The IMU 306 was mounted on the robot tool center such that its internal coordinate frame $^S(XYZ)$ was identical to frame $^E(XYZ)$ at the initial position.

To simulate a human hand's behavior, the welding robot was set in the teaching mode such that the robot tool center could be rotated manually and smoothly around the three axes of its internal frame. Four data sets were constructed in simulations denoted by $D_i^S$, where i=1, 2, 3, 4. To evaluate the performance of the example implementation in the three dimensions separately, the IMU 306 was rotated around one axis in each simulation. Hence, for $D_1^S$ to $D_3^S$, the robot tool center (and the IMU 306) was rotated around the x-axis, y-axis and z-axis, respectively. The rotation sequence in the three data sets is identical, i.e., first rotate 90° (the positive direction indicates a clockwise rotation as viewed from the negative to the positive direction of one axis), back to initial position, then rotate −30°, and back to initial position again. In each stage (at 90°, −30° and the initial positions), the robot tool center stayed still for a few seconds. It should be noted that the stationary phases might not exactly be 90°, −30° or 0°, since the robot tool center was manually rotated. Yet, it does not affect the simulation procedure, or the estimation accuracy.

For $D_4^S$, the robot tool center was rotated around the three axes together with the aforementioned rotation sequence. The robot tool center was thought to be much steadier than a human hand due to a human's inherent neuro latency. To this regard, data set $D_{4+n}^S$ was further artificially constructed by introducing two random Gaussian noises into the data from the gyro 322 and accelerometer 320 in $D_4^S$, respectively, in order to simulate the unsteadiness of a human hand.

The variances of the noise for the data from the gyro 322 and accelerometer 320 in $D_4^S$ were $5\times10^{-2}$ and $5\times10^{-1}$.

Two UKF implementations were studied, henceforth called method A and method B. Method A incorporated the auto-nulling algorithm described above, while method B did not. Two additional trapezoidal numerical integration methods were also included as two comparisons: method C adopted the auto-nulling algorithm described above, while method D did not. Four methods were tested at three different sampling rates: 256, 128 and 51.2 Hz. Six repeated tests were conducted for each condition, including both methods and sampling rates.

The performance metric adopted in the example implementation is the root-mean-square error (RMSE$_\theta$) of the orientation in degree, which is defined by $$RMSE_\theta = \sqrt{\frac{1}{n}\sum_{k=0}^{n-1}(\Delta\theta_k)^2} \tag{39}$$

where n is the sample number of the data set being evaluated:

$$\Delta\theta_k = \frac{2*180}{\pi}\arccos((q_{t_k}\otimes q_{e_k}^*)|0) \tag{40}$$

where $q_{t_k}$ and $q_{e_k}$ are the truth-reference and estimated quaternion. Besides the RMSE$_\theta$, the RMSEs of rotated Euler angles in three axes were also adopted, denoted by RMSE$_x$, MRSE$_y$ and RMSE$_z$, respectively.

Two data sets of torch orientation, denoted by $D_1^e$ and $D_2^e$, were obtained from welding experiments. The data set $D_1^e$ was collected from the GTAW experiments, containing four types of welding fit-ups sequentially corresponding to the configurations in FIG. 1, and the data set $D_2^e$ was obtained from the GMAW experiments including the welding types as shown in FIG. 2. Furthermore, two more data sets $D_{1+n}^e$ and $D_{2+n}^e$ were artificially constructed by introducing the same noise mentioned in the last section into $D_1^e$ and $D_2^e$, respectively. The tested method was method A, which was the contest winner in the simulation trials. Six repeated trials were conducted for each welding type.

TABLE 1

Major welding conditions for the GTAW experiments.

| Welding parameter | Conditions |
| --- | --- |
| Welding current (A) | 60 |
| Welding speed (mm s$^{-1}$) | 1~2 (varied by the welder) |
| Tungsten tip-to-work distance (mm) | 2~5 (varied by the welder) |
| Electrode extension (mm) | 3 |
| Electrode type | EWCe-2 |
| Electrode diameter (mm) | 2.38 |
| Electrode tip geometry (deg) | 30 |
| Shielding gas | Argon 100% |
| Flow rate of shielding gas (L min$^{-1}$) | 11.8 |
| Material | 2 mm thick 304 L sheet |

To construct the data sets, the torch 102 with attached IMU 306 (as shown in FIG. 3A) was mounted on the tool center of the welding robot which was set in the teaching mode. A novice welder was asked to hold the robot forearm and perform the aforementioned experiments. Each welding type lasted about 30 s. The welder took a break and set the torch 102 to the initial posture between every two welding trials. The welding conditions for the GTAW experiments are listed in table 1. No filler metal was used in the experiments. For the GMAW experiments, not only the torch orientations were required to be maintained, but the specific torch swing patterns needed to be followed. In the experiments, the arc did not start due to the limited welding skill of the novice welder, i.e., the torch 102 was firmly held above and smoothly dragged along the weld seam 106 without the arc being established. The experimental data was transmitted to a host computer, and was processed offline using Matlab R2011.

A reference 3D Cartesian coordinate frame $^{E'}(XYZ)$ was defined for the experimental data. The negative direction of $^{E'}Z$ coincided with the gravitational direction. The positive direction of $^{E'}Y$ was the welding direction along the weld seam. Axis $^{E'}X$ was then determined using the right-hand rule. In the experiments, the spatial relation between the torch and the robot was carefully calibrated. In the initial posture, the torch head was set such that directions of the axis in $^{E'}(XYZ)$ coincide with those in $^t(XYZ)$, respectively.

The initial parameters for the UKF are listed in table 2.

TABLE 2

Initializations of the UKF parameters for methods A and B.

| | $Q_{\sigma_q}$ | $Q_{\sigma_m}$ | $R_{\sigma_w}$ | $R_{\sigma_a}$ | α | β | κ |
| --- | --- | --- | --- | --- | --- | --- | --- |
| Method A | 0.18 | 0.08 | 0.5 | 0.2 | 1.4 | 1.0 | 0 |
| Method B | 0.27 | 0.18 | 1.2 | 0.4 | 1.0 | 0 | 3.0 |

The mean and standard deviation of the output of the gyro 322 when the IMU 306 is stationary at room temperature conditions, $\mu_s$ and $\sigma_s$, were measured using equations (41) and (42). The coefficients $\rho_\mu$ and $\rho_\sigma$ were chosen to be 1.0 when conducting the simulations:

$$\mu_s=[8.50\times10^{-3}\ 1.56\times10^{-2}\ 4.70\times10^{-3}] \tag{41}$$

$$\sigma_s=[1.18\times10^{-4}\ 1.47\times10^{-4}\ 9.87\times10^{-5}]. \tag{42}$$

The statistics of the resultant estimation of the RMSE$_\theta$ are listed in table 3. In table 3, the estimated performance of method A is compared with the other three counterpart algorithms by the mean and the standard deviation of the RMSE$_\theta$.

TABLE 3

Orientation estimation (RMSE$_\theta$), in the form of the mean ± standard deviation, obtained by the different estimation methods in the course of the Monte Carlo performance trials. The additional distance of gyro 322 and acceleration were artificially introduced in data set $D_{4+n}^S$.

| | $D_1^s$ | $D_2^s$ | $D_3^s$ | $D_4^s$ | $D_{4+n}^s$ |
| --- | --- | --- | --- | --- | --- |
| $f_s =$ 256 Hz | | | | | |
| A | 0.53 ± 0.11 | 0.47 ± 0.14 | 0.91 ± 0.20 | 0.98 ± 0.25 | 1.35 ± 0.34 |
| B | 2.56 ± 0.17 | 2.74 ± 0.55 | 1.50 ± 0.48 | 2.67 ± 0.41 | 3.02 ± 0.58 |
| C | 4.91 ± 0.54 | 5.11 ± 1.36 | 6.43 ± 0.81 | 7.48 ± 0.67 | 7.85 ± 0.98 |
| D | 25.97 ± 2.58 | 19.18 ± 1.57 | 21.72 ± 2.27 | 30.14 ± 3.49 | 32.56 ± 3.98 |
| $f_s =$ 128 Hz | | | | | |
| A | 0.50 ± 0.13 | 0.40 ± 0.16 | 0.94 ± 0.29 | 1.01 ± 0.20 | 1.28 ± 0.32 |

TABLE 3-continued

Orientation estimation (RMSE$_\theta$), in the form of the mean ± standard deviation, obtained by the different estimation methods in the course of the Monte Carlo performance trials. The additional distance of gyro 322 and acceleration were artificially introduced in data set $D_{4+n}{}^s$.

|  | $D_1{}^s$ | $D_2{}^s$ | $D_3{}^s$ | $D_4{}^s$ | $D_{4+n}{}^s$ |
|---|---|---|---|---|---|
| B | 3.52 ± 0.93 | 2.97 ± 0.73 | 2.25 ± 0.47 | 2.21 ± 0.35 | 2.45 ± 0.47 |
| C | 5.27 ± 1.18 | 6.12 ± 1.57 | 5.73 ± 0.36 | 7.14 ± 0.58 | 8.01 ± 0.79 |
| D | 28.39 ± 5.17 | 23.59 ± 4.18 | 29.42 ± 1.31 | 31.30 ± 4.78 | 41.44 ± 5.36 |
| $f_s =$ 51.2 Hz | | | | | |
| A | 0.67 ± 0.03 | 0.52 ± 0.08 | 1.57 ± 0.32 | 2.59 ± 0.24 | 2.81 ± 0.22 |
| B | 2.21 ± 0.28 | 3.74 ± 0.42 | 3.17 ± 0.52 | 3.75 ± 0.27 | 4.11 ± 0.31 |
| C | 5.45 ± 1.71 | 7.94 ± 3.84 | 8.49 ± 3.67 | 9.42 ± 3.65 | 9.84 ± 4.22 |
| D | 19.64 ± 3.82 | 18.12 ± 2.57 | 23.44 ± 5.12 | 25.14 ± 4.25 | 27.51 ± 4.44 |

The results of the orientation estimation for the three individual axes (RMSE$_s$[°]) are presented in table 4. The evaluated data sets are $D_1{}^s$, $D_2{}^s$ and $D_3{}^s$, respectively.

TABLE 4

Orientation estimation [RMSE$_\theta$](°), in the form of mean ± deviation, obtained by the different estimation methods in the course of six repeated trials for each simulation.

|  | $D_1{}^s$ RMSE$_x$ | $D_2{}^s$ RMSE$_y$ | $D_3{}^s$ RMSE$_z$ |
|---|---|---|---|
| $f_s = 256$ Hz | | | |
| A | 0.23 ± 0.01 | 0.16 ± 0.01 | 0.49 ± 0.04 |
| B | 0.26 ± 0.05 | 0.46 ± 0.29 | 1.14 ± 0.37 |
| C | 4.77 ± 0.58 | 4.60 ± 1.25 | 4.97 ± 0.71 |
| D | 12.86 ± 2.55 | 10.62 ± 1.30 | 13.42 ± 2.10 |
| $f_s = 128$ Hz | | | |
| A | 0.32 ± 0.02 | 0.25 ± 0.02 | 0.76 ± 0.14 |
| B | 0.34 ± 0.02 | 0.70 ± 0.03 | 1.72 ± 0.31 |
| C | 4.69 ± 0.69 | 4.34 ± 0.94 | 5.16 ± 0.23 |
| D | 15.39 ± 2.58 | 10.86 ± 2.46 | 20.34 ± 1.51 |
| $f_s = 51.2$ Hz | | | |
| A | 0.60 ± 0.02 | 0.46 ± 0.05 | 0.81 ± 0.18 |
| B | 0.62 ± 0.02 | 0.49 ± 0.05 | 2.24 ± 0.41 |
| C | 4.99 ± 1.39 | 6.68 ± 3.21 | 7.16 ± 2.33 |
| D | 10.97 ± 8.22 | 9.95 ± 1.64 | 24.79 ± 3.10 |

FIGS. 4 and 5 show the time functions of the Euler angles as they were measured in the simulation trials, and the reference measurements were from the welding robot. In particular, FIG. 4 shows the estimation of the orientation in the x-axis, y-axis and z-axis using data sets are $D_1{}^s$, $D_2{}^s$ and $D_3{}^s$, respectively. The 3D orientation estimation is presented in FIG. 5, obtained using the four algorithms with data set $D_4{}^s$. FIG. 6 shows the quaternion time functions obtained by method A, using the data set corresponding to FIG. 5. It should be noted that each of the figures only shows one of the estimation result of the six trials for the corresponding simulation conditions.

Tables 3 and 4 show the estimation results of slow torch movement, in which the angular rate is about 3° s$^{-1}$. The orientation estimation results for an angular rate larger than 5° s$^{-1}$ of the torch movement are presented in table 5.

TABLE 5

Dynamic Orientation estimation [RMSE$_\theta$](°), in the form of mean ± deviation, obtained by method A. The angular rate is larger than 5°

|  | $f_s = 51.2$ | $f_s = 128$ | $f_s = 256$ |
|---|---|---|---|
| $D_1{}^s$ | 1.40 ± 0.06 | 0.89 ± 0.18 | 0.61 ± 0.08 |
| $D_2{}^s$ | 1.74 ± 0.07 | 0.91 ± 0.19 | 0.54 ± 0.11 |
| $D_3{}^s$ | 1.89 ± 0.28 | 1.25 ± 0.35 | 1.10 ± 0.38 |
| $D_4{}^s$ | 3.28 ± 0.29 | 1.62 ± 0.35 | 1.25 ± 0.26 |
| $D_{4+n}{}^s$ | 3.56 ± 0.45 | 1.94 ± 0.41 | 1.55 ± 0.35 |

One can find from the simulation results that method A produces the best performance. The sampling rate chosen to conduct the experiments is 128 Hz, since it provided a good trade-off between estimation accuracy and computation load. Table 6 shows the mean and standard deviation of the estimated RMSE$_\theta$ obtained from the aforementioned experiments consisting of the two welding processes (GTAW and GMAW), each of which includes the four welding fit-ups.

TABLE 6

Orientation estimation [RMSE$_\theta$](°), produced by different data sets using method A with a sampling rate of $f_s = 128$ Hz. The four types of welding account for those in FIG. 1 (for data set $D_1{}^e$ and $D_{1+n}{}^e$), and in FIG. 2 (for data set $D_2{}^e$ and $D_{2+n}{}^e$).

|  | Type A | Type B | Type C | Type D |
|---|---|---|---|---|
| $D_1{}^e$ | 2.59 ± 0.37 | 3.10 ± 0.44 | 2.67 ± 0.46 | 2.78 ± 0.42 |
| $D_2{}^e$ | 2.37 ± 0.42 | 2.11 ± 0.59 | 2.14 ± 0.35 | 3.40 ± 0.54 |
| $D_{1+n}{}^e$ | 3.74 ± 0.51 | 3.46 ± 0.45 | 3.44 ± 0.45 | 3.32 ± 0.48 |
| $D_{2+n}{}^e$ | 4.04 ± 0.31 | 3.57 ± 0.41 | 3.84 ± 0.39 | 3.62 ± 0.51 |

Since the welding experiments last only about 40 s on average, the ambient temperature is not significantly changed compared with that when the IMU 306 were tested for the drift while in quasi-static equilibrium. Therefore, thermal coefficients $\rho_\mu$ and $\rho_\sigma$ were tuned in the range between 1.2 to 2.1 (they were set at 1.0 in the GMAW experiments).

FIGS. 7-10 show the typical orientation estimation results in Euler angles. In particular, FIG. 7 shows the estimation results in one GTAW process with a lap joint, corresponding to the welding process shown in FIG. 1(B). The initial posture of the torch 102 should be 0° in all the three axes. According to the related welding type (FIG. 1(B)), the welder is expected to maintain the 3D orientation of the torch at [20°, −20°, CR], where CR denotes 'customrelated', i.e., the orientation in that particular axis depends on the welder's individual operation custom. One can see in FIG. 7 that the torch orientation deviated about 5° from the recommended torch posture as shown in FIG. 1(B). This is normal since the welder is a novice welder who has not mastered the torch manipulation yet. The welding processes, the results of which are shown in FIGS. 8-10, are illustrated in FIGS. 2(A)-(C), respectively. The recommended torch postures for the three welding types are [10°~20°, −45°, CR], [80°, 0°, 0°], and [100°, 0°, 0°], respectively. Similarly, the orientation deviations from the corresponding recommendations are observed in the resultant figures. Nevertheless, those deviations do not affect the estimation accuracy.

In method A, the auto-nulling algorithm is incorporated in the effort to compensate the possible time-varying gyro drift during the simulations and the welding experiments; while for the in-line self-calibration of the accelerometer, multiple postures are required. However, the torch orientation is expected to be maintained at the recommended postures throughout the welding experiments. There are thus not enough postures in a single experiment for the accelerometer to conduct the calibration.

The UKF parameter initialization listed in table 2 is found to work well after running an extensive number of simulations or experiments, even in the presence of the incorporated noises. The IMU 306 was calibrated before use. In addition, the auto-nulling algorithm was also incorporated in method A to compensate for the gyro drift. Hence the covariances of the measurement noise and the process noise chosen for method A are comparatively small; while the covariances in method B are selected to be larger than those in A due to the absence of the auto-nulling algorithm. The process noise may be increased to compensate for the disturbance of the inaccurate modeling and to improve the tracking ability of the filter.

The results reported in tables 3 and 4 show that the combination of the UKF and the auto-nulling algorithm give the best performance. Results for the x-axis and y-axis orientation estimations are comparable in accuracy. Yet, the z-axis estimation shows comparatively poor accuracy. It is arguable that because the accelerometer 320 cannot provide the torch's orientation information in the z-axis, estimations in the UKF solely rely on the accuracy of the gyro 322 outputs themselves. The performance is thus relatively poor without aid from the acceleration data. Another interesting observation can be found in table 4 by comparing the performance of method A and method B: the $RMSE_x$s and $RMSE_y$s yielded by the two methods are comparable, yet, the corresponding $RMSE_\theta$ obtained using method A is significantly smaller. One can conclude from this observation: (1) the main source of $RMSE_\theta$ is from the estimation for the z-axis (heading); (2) significant improvement in estimation accuracy can be obtained by applying the auto-nulling algorithm described herein to compensate for the gyro drift.

In another example implementation, data from a magnetic sensor 328 is fused into the UKF to improve the estimation accuracy in the z-axis. However, the existence of the strong magnetic interference from the welding machine and welding arc, poses challenges to maintaining accuracy of the orientation estimation. Fortunately, even without an extra magnetic sensor 328, the 3D estimation errors reported in tables 3 and 6 may be acceptable. Furthermore, in implementations in which only accelerometers and gyroscopes are applied, cost/complexity is reduced as compared to an implementation in which magnetometers are added.

Degradations in estimation accuracy are observed in both tables 3 and 6 after injecting the noise into the gyro data and acceleration data. The auto-nulling algorithm is able to compensate for the noise in the gyro data. However, the contaminated acceleration data contains both the gravitation and the fake acceleration induced by the injected noise, while the acceleration of the IMU 306 is considered as a disturbance in the sensor model (equation (8)). The sensor model thus tends to be less accurate with the existence of the acceleration, and that leads to a degraded orientation estimation. Similar results can be found in table 5. As the torch movement becomes faster, the accelerometer is more likely to detect the acceleration of the torch's movement. The estimation accuracy is thus degraded.

Within the limits of the analysis performed, increasing the sampling rate does improve the estimation accuracy, but its effect is not prominent. Unlike the EKF, which usually requires a high sampling rate to avoid the possible filter instability, the UKF has no such stability issue. Increasing the sampling rate is a huge computation and energy assumption burden for a battery-powered IMU 306. Therefore, the sampling rate was set at 128 Hz in the welding experiments.

One can find that some of the recommended torch orientations do not require specifications for the z-axis posture, such as those for the welding types in FIG. 1. This is because the torch posture in the z-axis does not necessarily relate to weld quality in some welding processes. On the other hand, a proper z-axis torch posture is recommended for weld types like those shown in FIG. 2, in order to perform a qualified weld. Furthermore, in the applications mentioned in section 1, an accurate totally 3D orientation estimation can be highly useful.

The effect of the torch's swing motions to the torch 102 orientation can be found by comparing FIG. 7 and FIGS. 8-10: more ripples are observed in the torch orientation curves as torch swing motions are augmented. Yet, no extra errors were observed to be yielded in the orientation estimation due to the swing motions.

Methods and systems are provided herein for measuring 3D welding torch orientation, which can be conveniently adapted into a manual arc welding process or a welder training system, are described herein. An example implementation comprises a quaternion-based UKF incorporated by an auto-nulling algorithm. The UKF aims for the estimation of the 3D welding torch orientation using a miniature IMU 306 endowed with a tri-axis gyro and a tri-axis accelerometer. The auto-nulling algorithm serves as an in-line calibration procedure to compensate for the gyro drift, which has been verified to significantly improve the estimation accuracy in three-dimensions, especially in the heading estimation. In an example implementation, the methods and systems described herein provide an accurate orientation estimation without aid from an extra magnetometer. The accuracy of the estimation has been validated by simulation and welding experiments. Statistics show that the estimation error in an example implementation is in the order of 3°.

In accordance with an example implementation of this disclosure, a system (e.g., 330) receives signals from an inertial measurement unit (e.g., 306) affixed to an apparatus (e.g., a tool such as a welding torch 102, a cutting torch, saw, etc. or a tool accessory such as gloves) and analyzes the signals to detect whether the apparatus is in quasi-static equilibrium. The system generates a gravitational acceleration vector based on a portion of the signals received while the torch is in quasi-static equilibrium (e.g., during extended periods when the operator intentionally pauses and/or during inadvertent/momentary intervals on the order of milliseconds). The system may perform a real-time (e.g., during a welding or cutting operation where the apparatus is a welding or cutting torch) calibration of the inertial measurement unit based on the gravitational acceleration vector. The performance of the real-time calibration may comprise a determination of the angle between an axis of a coordinate system of the inertial measurement unit (e.g., FIG. 3B) and the gravitational acceleration vector. The performance of the real-time calibration may comprise determination of an initial angle (e.g., $\theta_{ST}$) for a gyroscope of the inertial measurement system. The performing the real-time calibration may comprise determining a rate of angular drift. The system may determine orientation of the inertial measurement unit in real-time based on the signals and based on values determined during the real-time calibration. The system may process the signals using an unscented Kalman filter.

In accordance with an example implementation of this disclosure, a system (e.g., 330), comprises a processor (e.g., 323) and a transceiver (e.g., 336). During a time interval in which an apparatus is known to be in quasi-static equilibrium (e.g., during extended periods when the operator intentionally pauses and/or during inadvertent/momentary intervals on the order of milliseconds), the transceiver receives a first set of gyroscope output samples from an inertial measurement unit e.g., 306) affixed to an apparatus (e.g., a tool such as a welding torch 102, a cutting torch, saw, etc. or a tool accessory such as gloves), and the processor calculates one or more metrics for the first set of gyroscope output samples. During manipulation of the apparatus (e.g., during a weld operation or cutting operation where the apparatus is a welding torch or cutting torch) the transceiver receives a second set of gyroscope output samples from the inertial measurement unit affixed to the apparatus. During manipulation of the apparatus, the processor calculates the one or more metrics for the second set of gyroscope output samples, generates a decision as to whether the apparatus is in quasi-static equilibrium based on the one or more metrics for the first set of gyroscope output samples and the one or more metrics for the second set second gyroscope output samples, and determines an angular velocity of the apparatus based on the second set of gyroscope samples and based on the decision as to whether the apparatus is in quasi-static equilibrium. The processor may determine a drift of the gyroscope based on a mean value of the first set of gyroscope output samples. The processor may use the drift of the gyroscope during the determination of the angular velocity of the apparatus. If the decision is that the apparatus is in quasi-static equilibrium, the determination of the angular velocity of the apparatus may comprise a determination of the angular velocity to be a mean value of the second set of gyroscope output samples, and if the decision is that the apparatus is not in quasi-static equilibrium, the determination of the angular velocity may include compensation for the drift. The determination of the angular velocity may include compensation for a difference between a temperature of the inertial measurement unit during generation of first set of gyroscope output samples and a temperature of the inertial measurement unit during generation of the second set of gyroscope output samples. The one or more metrics may comprise one or both of mean and standard deviation. The generation of the decision as to whether the apparatus is in quasi-static equilibrium may comprise a determination of a difference, or absolute difference, between the one or more metrics for the first set of gyroscope output samples and the one or more metrics for the second set of gyroscope output samples.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set { (x), (y), (z), (x, y), (x, z), (y, z), (x, y, z)}. In other words, "x, y and/or z" means "one or more of x, y and z".

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:
   receiving signals from an inertial measurement unit affixed to an apparatus;
   analyzing said signals to detect whether said apparatus is in quasi-static equilibrium;
   generating a gravitational acceleration vector based on a portion of said signals received while said apparatus is in said quasi-static equilibrium; and
   performing a real-time calibration of said inertial measurement unit based on said gravitational acceleration vector.

2. The method of claim 1, wherein said performing said real-time calibration comprises determining the angle between an axis of a coordinate system of said inertial measurement unit and said gravitational acceleration vector.

3. The method of claim 1, wherein said performing said real-time calibration comprises determining an initial angle for a gyroscope of said inertial measurement system.

4. The method of claim 1, wherein said performing said real-time calibration comprises determining a rate of angular drift.

5. The method of claim 1, comprising determining orientation of said inertial measurement unit in real-time based on said signals and based on values determined during said real-time calibration.

6. The method of claim 5, comprising processing said signals using an unscented Kalman filter.

7. A method comprising:
   during a time interval in which an apparatus is known to be in quasi-static equilibrium:
     receiving, via a transceiver, a first set of gyroscope output samples from an inertial measurement unit affixed to said apparatus;
     calculating, by a processor, one or more metrics for said first set of gyroscope output samples;
   during manipulation of said apparatus:
     receiving, via said transceiver, a second set of gyroscope output samples from said inertial measurement unit affixed to said apparatus;
     calculating, by said processor, said one or more metrics for said second set of gyroscope output samples;

generating, by said processor, a decision as to whether said apparatus is in said quasi-static equilibrium based on said one or more metrics for said first set of gyroscope output samples and said one or more metrics for said second set second gyroscope output samples; and determining, by said processor, an angular velocity of said apparatus based on said second set of gyroscope samples and based on said decision as to whether said apparatus is in said quasi-static equilibrium.

8. The method of claim 7, comprising determining a drift of said gyroscope based on a mean value of said first set of gyroscope output samples.

9. The method of claim 8, comprising using said drift of said gyroscope during said determining said angular velocity of said apparatus.

10. The method of claim 8, wherein:
if said decision is that said apparatus is in said quasi-static equilibrium, said determining said angular velocity of said apparatus comprises determining said angular velocity to be a mean value of said second set of gyroscope output samples; and
if said decision is that said apparatus is not in said quasi-static equilibrium, said determining said angular velocity comprises compensating for said drift.

11. The method of claim 7, wherein said determining said angular velocity comprises compensating for a difference between a temperature of said inertial measurement unit during generation of first set of gyroscope output samples and a temperature of said inertial measurement unit during generation of said second set of gyroscope output samples.

12. The method of claim 7, wherein said one or more metrics comprise one or both of mean and standard deviation.

13. The method of claim 7, wherein said generating said decision as to whether said apparatus is in said quasi-static equilibrium comprising determining a difference, or absolute difference, between said one or more metrics for said first set of gyroscope output samples and said one or more metrics for said second set of gyroscope output samples.

14. The method of claim 7, wherein said time interval is on the order of milliseconds.

15. A system comprising:
a computing device comprising a receiver and a processor, wherein:
said receiver is configured to
receive, during a time interval in which an apparatus is known to be in quasi-static equilibrium, a first set of gyroscope output samples from an inertial measurement unit affixed to said apparatus; and
receiver, during manipulation of said apparatus, a second set of gyroscope output samples from said inertial measurement unit affixed to said apparatus; and said processor is configured to:
calculate one or more metrics for said first set of gyroscope output samples;
calculate said one or more metrics for said second set of gyroscope output samples;
generate a decision as to whether said apparatus is in said quasi-static equilibrium based on said one or more metrics for said first set of gyroscope output samples and said one or more metrics for said second set second gyroscope output samples; and
determine an angular velocity of said apparatus based on said second set of gyroscope samples and based on said decision as to whether said apparatus is said quasi-static equilibrium.

16. The system of claim 15, wherein said processor is configured to determine a drift of said gyroscope based on a mean value of said first set of gyroscope output samples.

17. The system of claim 16, wherein said processor is configured to use said drift of said gyroscope during said determination of said angular velocity of said apparatus.

18. The system of claim 16, wherein:
if said decision is that said apparatus is in said quasi-static equilibrium, said determination of said angular velocity of said apparatus is a determination of a mean value of said second set of gyroscope output samples; and
if said decision is that said apparatus is not in said quasi-static equilibrium, said determination of said angular velocity of said apparatus comprises compensating said mean value of said second set of gyroscope output samples based on said drift.

19. The system of claim 15, wherein said determination of said angular velocity comprises compensation for a difference between a temperature of said inertial measurement unit during generation of first set of gyroscope output samples and a temperature of said inertial measurement unit during generation of said second set of gyroscope output samples.

20. The system of claim 15, wherein said one or more metrics comprise one or both of mean and standard deviation.

21. The system of claim 15, wherein said generation of said decision as to whether said apparatus is in said quasi-static equilibrium comprising a determination of a difference, or absolute difference, between said one or more metrics for said first set of gyroscope output samples and said one or more metrics for said second set of gyroscope output samples.

22. The system of claim 15, wherein said time interval is on the order of milliseconds.

\* \* \* \* \*